(12) United States Patent
Shpak

(10) Patent No.: US 11,228,469 B1
(45) Date of Patent: Jan. 18, 2022

(54) APPARATUS, SYSTEM AND METHOD FOR PROVIDING LOCATIONING MULTIPATH MITIGATION

(71) Applicant: Deeyook Location Technologies Ltd., Tel Aviv (IL)

(72) Inventor: Eran Shpak, Tel Aviv (IL)

(73) Assignee: DEEYOOK LOCATION TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 16/931,035

(22) Filed: Jul. 16, 2020

(51) Int. Cl.
*H04L 25/03* (2006.01)
*H04L 25/02* (2006.01)

(52) U.S. Cl.
CPC ...... *H04L 25/03821* (2013.01); *H04L 25/025* (2013.01); *H04L 25/03159* (2013.01)

(58) Field of Classification Search
CPC ...... H04L 25/025; H01Q 1/523; H01Q 15/08; H01Q 1/421; H01Q 5/307; H01Q 9/0407; H01Q 9/0414; H01Q 1/243; H01Q 21/065; H04B 1/40
See application file for complete search history.

(56) References Cited

U.S. PATENT DOCUMENTS

| | | | |
|---|---|---|---|
| 4,728,959 A * | 3/1988 | Maloney | G01S 3/48 342/457 |
| 5,327,144 A * | 7/1994 | Stilp | H04W 64/00 342/387 |
| 6,208,297 B1 | 3/2001 | Fattouche et al. | |

(Continued)

FOREIGN PATENT DOCUMENTS

| | | | | |
|---|---|---|---|---|
| CN | 105792129 A | * | 7/2016 | |
| CN | 109952801 A | * | 6/2019 | ............... G01S 5/08 |

(Continued)

OTHER PUBLICATIONS

S. Koenig, et al,, "Multipath mitigation for indoor localization based on IEEE 802.11 time-of-flight measurements," 2011 IEEE International Symposium on a World of Wireless, Mobile and Multimedia Networks, 2011, pp. 1-8, doi: 10.1109/WoWMoM.2011.5986392. (Year: 2011).*

(Continued)

*Primary Examiner* — Berhanu Tadese
(74) *Attorney, Agent, or Firm* — Brooks Kushman P.C.

(57) ABSTRACT

In at least one embodiment, a system for providing locationing multipath mitigation for wireless communication is provided. The system includes a receiver having at least one controller. The at least one controller is programmed to; receive a first narrowband wireless signal including a predetermined symbol from a transmitter across a wideband transmission channel that exhibits a multipath condition and additive noise, the first narrowband wireless signal being convoluted with the wideband channel to form a first received signal and to perform autocorrelation on the first received signal to extract the predetermined symbol. The at least one controller is further configured to filter the extracted predetermined symbol to deconvolve the first received signal to minimize the effects of the multipath condition and the additive noise to provide a first deconvoluted signal.

30 Claims, 19 Drawing Sheets

(56) References Cited

U.S. PATENT DOCUMENTS

| | | | | |
|---|---|---|---|---|
| 6,336,092 | B1* | 1/2002 | Gibson | G10H 1/366 |
| | | | | 704/207 |
| 6,587,811 | B2* | 7/2003 | Schleifer | G01R 13/345 |
| | | | | 327/161 |
| 6,868,162 | B1* | 3/2005 | Jubien | H03G 5/22 |
| | | | | 381/107 |
| 7,502,688 | B2* | 3/2009 | Hirokawa | G01C 21/165 |
| | | | | 342/357.31 |
| 8,130,141 | B2* | 3/2012 | Pattabiraman | G01S 19/46 |
| | | | | 342/357.29 |
| 8,581,781 | B2* | 11/2013 | Slastion | G01S 3/74 |
| | | | | 342/424 |
| 8,797,213 | B2* | 8/2014 | Pun | G01S 3/48 |
| | | | | 342/442 |
| 8,823,589 | B2* | 9/2014 | Wang | G01S 5/0242 |
| | | | | 342/463 |
| 9,363,683 | B2* | 6/2016 | Raghavan | H04B 7/088 |
| 9,804,256 | B2* | 10/2017 | Jamieson | G01S 5/04 |
| 9,814,051 | B1* | 11/2017 | Shpak | G01S 5/10 |
| 10,182,315 | B2* | 1/2019 | Shpak | H04B 7/0617 |
| 2001/0053699 | A1 | 12/2001 | McCrady et al. | |
| 2003/0129996 | A1* | 7/2003 | Maloney | G01S 5/12 |
| | | | | 455/456.1 |
| 2008/0039030 | A1* | 2/2008 | Khan | H04B 7/0617 |
| | | | | 455/101 |
| 2008/0161016 | A1* | 7/2008 | Hochwald | G01S 5/0252 |
| | | | | 455/456.2 |
| 2009/0243932 | A1* | 10/2009 | Moshfeghi | G01S 13/38 |
| | | | | 342/378 |
| 2010/0321241 | A1* | 12/2010 | Janosky | G01S 5/04 |
| | | | | 342/444 |
| 2011/0221635 | A1* | 9/2011 | Wang | G01S 5/0242 |
| | | | | 342/463 |
| 2011/0286497 | A1* | 11/2011 | Nervig | H04L 25/03159 |
| | | | | 375/147 |
| 2012/0001795 | A1* | 1/2012 | DeLaurentis | G01S 13/9004 |
| | | | | 342/25 F |
| 2012/0106380 | A1 | 5/2012 | Vaidyanathan et al. | |
| 2013/0057436 | A1* | 3/2013 | Krasner | G01S 19/48 |
| | | | | 342/464 |
| 2013/0250791 | A1 | 9/2013 | Sugar et al. | |
| 2014/0218240 | A1* | 8/2014 | Kpodzo | G01S 5/0215 |
| | | | | 342/450 |
| 2016/0033614 | A1* | 2/2016 | Wang | G01S 3/043 |
| | | | | 342/378 |
| 2016/0366554 | A1* | 12/2016 | Markhovsky | H04L 5/005 |
| 2017/0090026 | A1* | 3/2017 | Joshi | G01S 13/56 |
| 2017/0367065 | A1* | 12/2017 | Seth | H04W 64/00 |
| 2018/0146332 | A1* | 5/2018 | Opshaug | G01S 5/0036 |
| 2018/0149729 | A1* | 5/2018 | Grandin | G01S 5/12 |
| 2018/0167783 | A1* | 6/2018 | Khoche | B32B 37/06 |
| 2018/0231666 | A1* | 8/2018 | Lennen | G01S 19/426 |
| 2018/0249453 | A1* | 8/2018 | Nagaraja | H04W 72/042 |
| 2018/0364735 | A1* | 12/2018 | Holmstrom | G01S 19/26 |
| 2019/0204409 | A1 | 7/2019 | Booij et al. | |
| 2019/0257954 | A1* | 8/2019 | Lennen | G01S 19/37 |
| 2020/0068644 | A1* | 2/2020 | Zhou | H04W 72/04 |
| 2020/0150216 | A1* | 5/2020 | Shpak | G01S 5/10 |
| 2020/0191913 | A1* | 6/2020 | Zhang | G01S 7/006 |
| 2020/0275426 | A1* | 8/2020 | Silverman | H04W 72/042 |

FOREIGN PATENT DOCUMENTS

| | | | | |
|---|---|---|---|---|
| EP | 2182376 | A2 * | 5/2010 | G01S 19/22 |
| EP | 3186654 | A1 * | 7/2017 | H04W 4/027 |
| EP | 3516913 | A1 * | 7/2019 | G01S 5/0221 |
| EP | 3516913 | A4 * | 4/2020 | H04L 27/2656 |
| KR | 20190065307 | A * | 6/2019 | H04L 27/2656 |
| WO | WO-2007025363 | A1 * | 3/2007 | G01S 7/285 |
| WO | WO-2012172458 | A1 * | 12/2012 | A61B 8/52 |
| WO | 2018055482 | A1 | 3/2018 | |
| WO | WO-2018055482 | A1 * | 3/2018 | H04L 5/12 |
| WO | WO-2019234415 | A1 * | 12/2019 | G06Q 10/00 |

OTHER PUBLICATIONS

Zhilong Zheng, Jingyu Hua, Yuan Wu, Hao Wen and Limin Meng, "Time of arrival and Time Sum of arrival based NLOS identification and localization," 2012 IEEE 14th International Conference on Communication Technology, 2012, pp. 1129-1133, doi: 10.1109/ICCT.2012.6511366. (Year: 2012).*

M. Kottkamp et al. LTE Release 9 Technology Introduction, Rohde & Schwarz, Dec. 2011 (Year: 2011).*

D. P. Mandic, S. Kanna and A. G. Constantinides, "On the Intrinsic Relationship Between the Least Mean Square and Kalman Filters [Lecture Notes]," in IEEE Signal Processing Magazine, vol. 32, No. 6, pp. 117-122, Nov. 2015, doi: 10.1109/MSP.2015.2461733. (Year: 2015).*

A. Nehorai and M. Morf, "A mapping result between Wiener theory and Kalman filtering for nonstationary processes," in IEEE Transactions on Automatic Control, vol. 30, No. 2, pp. 175-177, Feb. 1985, doi: 10.1109/TAC.1985.1103909. (Year: 1985).*

U.S. Appl. No. 16/731,106, "Interferometric Location Sensing" filed Dec. 31, 2019.

U.S. Appl. No. 16/814,356, "System, Apparatus, and/or Method for Determining a Time of Flight for One or More Receivers and Transmitters" filed Mar. 10, 2020.

U.S. Appl. No. 15/930,043, "System, Apparatus, and/or Method for Providing Wireless Applications Based on Locationing Solutions" filed May 12, 2020.

International Search Report dated Oct. 25, 2021 for PCT Appn. No. PCT/IB2021/056412 filed Jul. 15, 2021, 19 pgs.

* cited by examiner

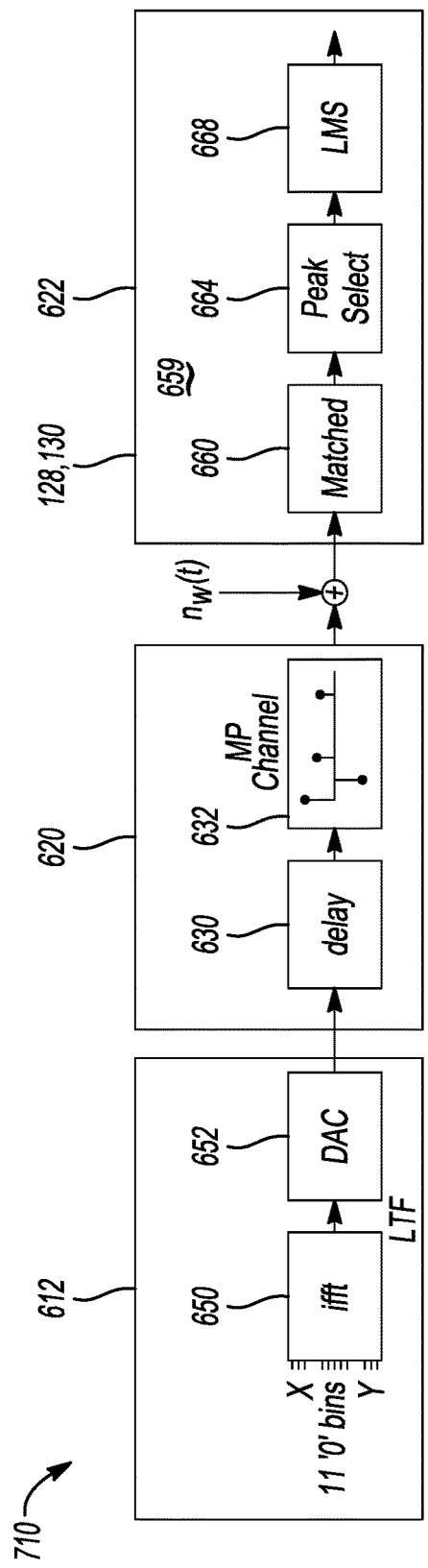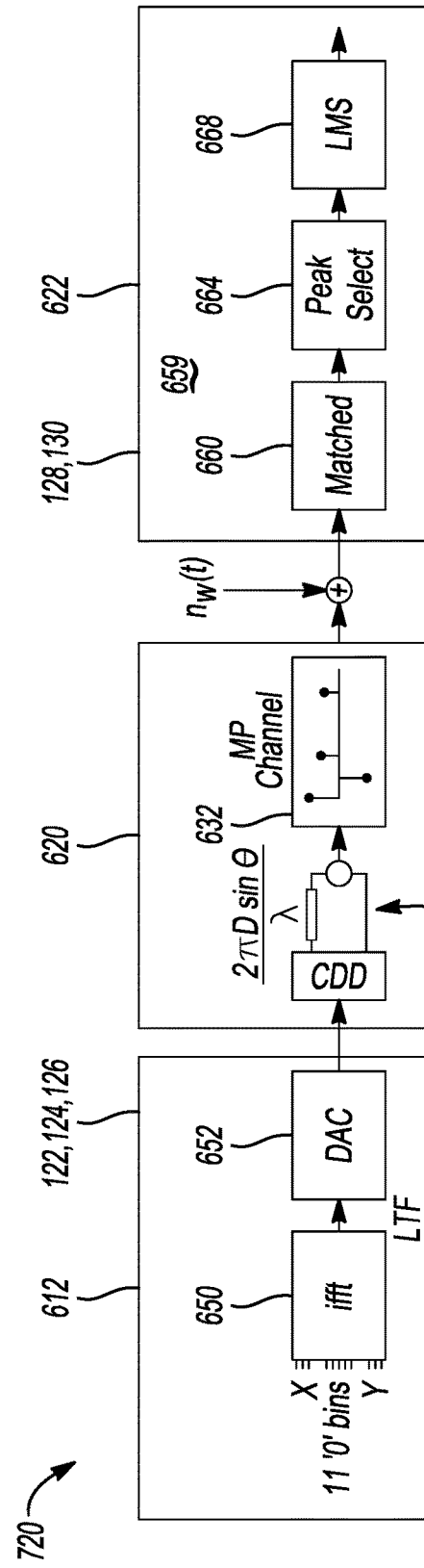

APPARATUS, SYSTEM AND METHOD FOR PROVIDING LOCATIONING MULTIPATH MITIGATION

TECHNICAL FIELD

Aspects disclosed herein generally relate to a system, apparatus, and/or method for providing wireless applications based on locationing solutions. In one example, the embodiments as disclosed herein provide a system, apparatus, and/or method for providing locationing multipath mitigation for wireless applications. These aspects and others will be discussed in more detail below.

BACKGROUND

U.S. Pat. No. 10,182,315 to Shpak (hereafter the '315 patent) discloses a method for signal processing that includes receiving at a given location, at least first and second signals transmitted, respectively, from at least first and second antennas of a wireless transmitter. The at least first and second signals encode identical data using a multi-carrier encoding scheme with a predefined cyclic delay between the transmitted signals. The received first and second signals are processed, using the cyclic delay, in order to derive a measure of a phase delay between the first and second signals. Based on the measure of the phase delay, an angle of departure of the first and second signals from the wireless access point to the given location is estimated.

U.S. Pat. No. 9,814,051 also to Shpak (hereafter the '051 patent) discloses a method for signal processing. The method provides, among other things, receiving at a given location at least first and second signals transmitted, respectively, from at least first and second antennas of a wireless transmitter, the at least first and second signals encoding identical data using a multi-carrier encoding scheme with a predefined cyclic delay between the transmitted signals and processing the received first and second signals, using the cyclic delay, in order to derive a measure of a phase delay between the first and second signals. Based on the measure of the phase delay, the method provides estimating an angle of departure of the first and second signals from the wireless transmitter to the given location.

SUMMARY

In at least one embodiment, a system for providing locationing multipath mitigation for wireless communication is provided. The system includes a receiver having at least one controller. The at least one controller is programmed to; receive a first narrowband wireless signal including a predetermined symbol from a transmitter across a wideband transmission channel that exhibits a multipath and additive noise condition, the first narrowband wireless signal being convoluted with the wideband channel to form a first received signal and to perform autocorrelation on the first received signal to extract the predetermined symbol. The at least one controller is further configured to filter the extracted predetermined symbol to deconvolve the first received signal to provide a first deconvoluted signal to provide the wideband transmission channel independent of characteristics of the multipath and additive noise condition.

In at least one embodiment, a system for providing locationing multipath mitigation for wireless communication is provided. The system includes a receiver having at least one controller being programmed to: receive a first narrowband wireless signal including a predetermined symbol from a transmitter across a wideband transmission channel that exhibits a multipath condition, the first narrowband wireless signal being convoluted with the wideband channel to form a first received signal and to perform autocorrelation on the first received signal to extract the predetermined symbol. The at least one controller is further configured to perform a least mean square (LMS) optimization on the extracted predetermined symbol to estimate the multipath condition and to eliminate the multipath condition from the first received signal to obtain the first narrowband wireless signal.

In at least one embodiment, a method for providing locationing multipath mitigation for wireless communication is provided. The method includes receiving a first narrowband wireless signal including a predetermined symbol from a transmitter across a wideband transmission channel that exhibits a multipath and additive noise condition, the first narrowband wireless signal being convoluted with the wideband channel to form a first received signal and performing autocorrelation on the first received signal to extract the predetermined symbol. The method further includes filtering the extracted predetermined symbol to deconvolve the first received signal to minimize the effects of the multipath condition and the additive noise to provide a first deconvoluted signal.

In at least one embodiment, a method for providing locationing multipath mitigation for wireless communication is provided. The method includes receiving a first narrowband wireless signal including a predetermined symbol from a transmitter across a wideband transmission channel that exhibits a multipath condition, the first narrowband wireless signal being convoluted with the wideband channel to form a first received signal and performing autocorrelation on the first received signal to extract the predetermined symbol. The method further includes performing a least mean square (LMS) optimization on the extracted predetermined symbol to estimate the multipath condition and to eliminate the multipath condition from the first received signal to obtain the first narrowband wireless signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 21 depicts a system for providing a parametric mitigation for a multipath condition based on the ToF locationing implementation including a parametric mitigation block in accordance to one embodiment;

FIG. 22 depicts a system for providing a parametric mitigation for a multipath condition based on the interferometric location sensing implementation including a parametric mitigation block in accordance to one embodiment;

DETAILED DESCRIPTION

Figure 1:
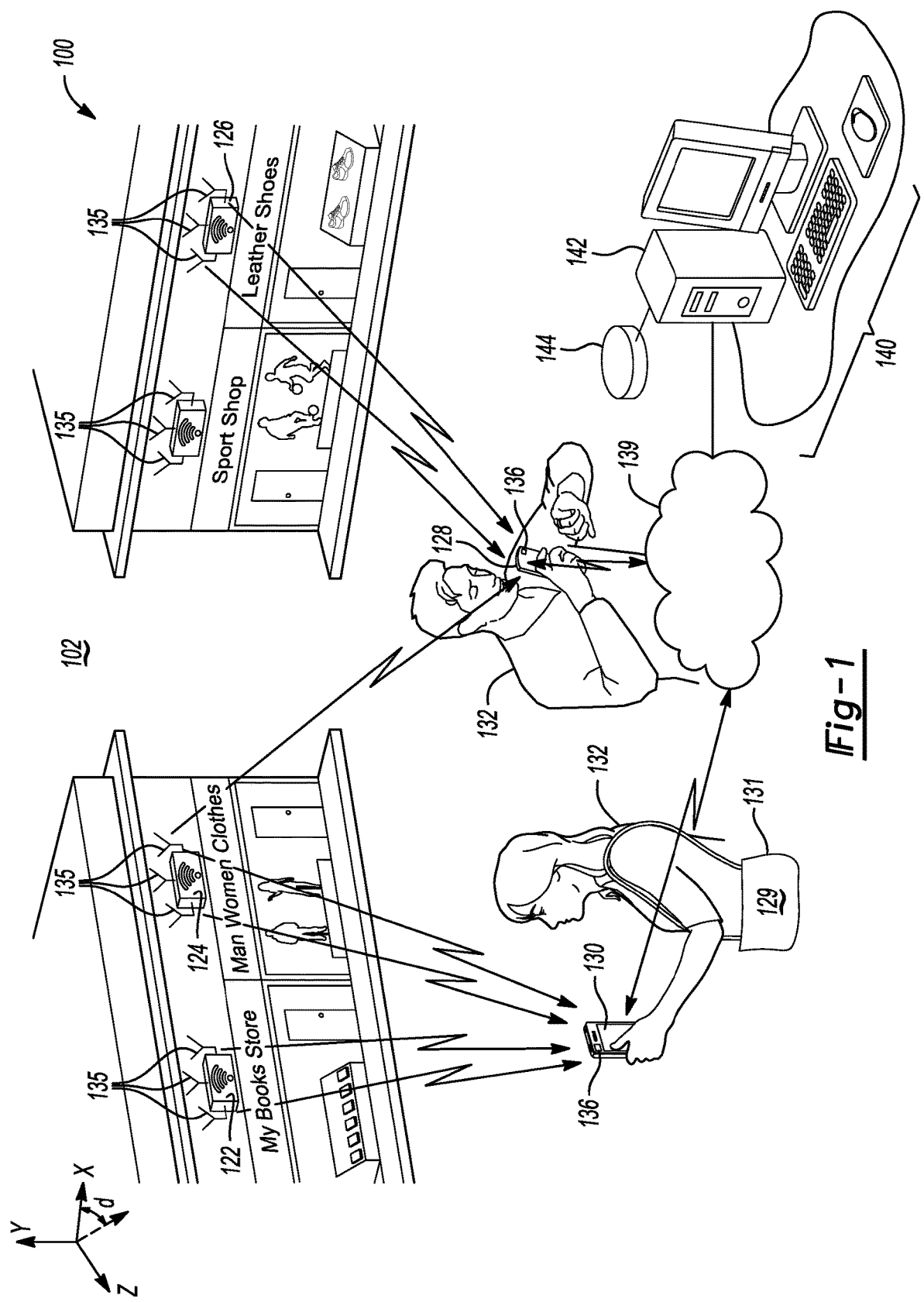
FIG. 1 is schematic, pictorial illustration of a system for wireless location finding, in accordance with an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that at least one controller (or at least one processor) as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, the at least one controller as disclosed herein utilize one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The disclosed controller(s) also include hardware-based inputs and outputs for receiving and transmitting data, respectively from and to other hardware-based devices as discussed herein.

Electromagnetic (EM) Locationing solutions generally provide location estimates by employing wave propagation phenomena such as for example Direction Finding (DF) and Time of flight (ToF). DF and ToF may rely on ray propagation model whereby EM waves traverse the shortest path from a transmitter to a receiver. In practical conditions, the medium is not free space (FS). For example, objects illuminated by the transmitter may reflect impinging waves en route to the receiver, thereby creating secondary paths called Multipath (MP). The locationing receiver is degraded by the MP. Mitigation, in the form of signal processing at the receiver, is aimed at minimizing the degradation, relative to FS conditions. A unified solution is proposed for both DF and ToF using wideband wireless signals. Typical signals falling into this category may include 20 MHz orthogonal frequency-Division Multiplexing (OFDM) and 22 MHz Complementary Code Keying (CCK), for example, WiFi and cellular telephony.

Locationing solutions for determining a location of a mobile wireless transceiver, such as for a mobile device are generally set forth in pending U.S. application Ser. No.

16/731,106 ("the '106 application") entitled "INTERFEROMETRIC LOCATION SENSING" as filed on Dec. 31, 2019 and in pending U.S. application Ser. No. 16/814,356 ("the '356 application") entitled "SYSTEM, APPARATUS, AND/OR METHOD FOR DETERMINING A TIME OF FLIGHT FOR ONE OR MORE RECEIVERS AND TRANSMITTERS" as filed on Mar. 10, 2020 the disclosures of which are hereby incorporated by reference in their entirety. Additional locationing systems are also disclosed in pending U.S. application Ser. No. 15/930,043 ("the '043 application) entitled "SYSTEM, APPARATUS, AND/OR METHOD FOR PROVIDING WIRELESS APPLICATIONS BASED ON LOCATIONING SOLUTIONS" as filed on May 12, 2020 the disclosure of which is hereby incorporated by reference in its entirety. Embodiments as disclosed herein may employ various mitigation approaches for accounting for multipath transmissions (e.g., transmissions sent by transmitters to receivers that are blocked by obstacles). In one example, a non-parametric mitigation scheme may be employed to mitigate multipath transmissions. The non-parametric mitigation scheme may employ, but not limited to, a linear filter to characterize a transmission between the transmitter and receiver instead of a transmission channel. In another example, a parametric mitigation scheme may be employed to mitigate multipath transmissions. In another example, a hybrid scheme may be employed that utilizes a combination of aspects from the non-parametric mitigation scheme and the parametric mitigation scheme to resolve multipath transmissions. These aspects and others will be discussed in more detail below.

System Description

FIG. 1 is schematic, pictorial illustration of a system 100 for wireless communications and position finding, in accordance with an embodiment of the invention. By way of example, FIG. 1 shows a typical environment, such as a shopping mall or street, in which multiple access points 122, 124, 126 are deployed, often by different WLAN proprietors independently of one another. It is recognized that the number of access points 122, 124, 126 may vary. Signals transmitted by the access points 122, 124, 126 are received by receivers in the form of mobile devices 128, 130 which are operated by users 132. The users 132 are free to move around within the area covered by system 100. In the illustrated embodiment, the mobile devices 128, 130 are shown as cellular phone; but other sorts of mobile transceivers, such as laptop, tablets computers, wearable electronic devices (e.g., smart watches), etc. may be used in similar fashion and can similarly find angles from departure of access points 122, 124, 126 as described hereinbelow. It is recognized that the number of mobile devices 128, 130 may also vary. It is also recognized that the mobile device 128 may also correspond to a location tag 131 that includes a wireless transceiver and other electronic circuitry that is arranged for attachment to an object 129. For example, the object 129 may correspond to a women's handbag (or purse) and the location tag 131 may provide information indicative of the location of the handbag 129. The location tag 131 may transmit information corresponding to the location of the object to one or more access points 122, 124, 126 and/or to at least one server 140. Each mobile device 128, 130 generally includes a MODEM or other apparatus for enabling wireless communication with the various access points 122, 124, 126 in the environment.

The access points 122, 124, 126 may find angles of arrival of signals transmitted by the mobile devices 128, 130. Each of access points 122, 124, 126 in system 100 is assumed, for example, to have two or three antennas 135, as shown in FIG. 1. The number of antennas 135 may vary in the system 100. The mobile devices 128, 130 are each assumed to have a single, omnidirectional antenna 136, although the techniques described herein for detecting angles can similarly be implemented by multi-antenna stations.

The mobile devices 128, 130 process signals received from antennas 135 to estimate the angles of departure of the signals from the respective access points 122, 124, 126 as well as to extract an identifier (such as the Basic Service Set Identifiers (BSSID)) with regard to each access point 122, 124, 126. The angles of departure in the coordinate frame of the access points 122, 124, 126 (e.g., identified a in FIG. 1) may be computed in two dimensions, assuming the access points 122, 124, 126 and mobile devices 128, 130 are in proximity to a common plane, or in a three-dimensional coordinate system. The mobile devices 128, 130 perform these functions, as described further hereinbelow, without necessarily wirelessly associating with the access points 122, 124, 126.

On the other hand, mobile devices 128, 130 may associate with one or more of access points 122, 124, 126 for purposes of Internet communications. Alternatively or additionally, the mobile devices 128, 130 may access the Internet via a cellular network or other connection. In any case, the mobile devices 128, 130 communicate the angle-of-departure data and access point identification that they collect via a network 139 to a mapping server 140. This information may be collected and reported autonomously and automatically by a suitable application program ("app") running in the background on the mobile devices 128, 130. Alternatively or additionally, the access points may compute and communicate angle-of-departure data to the server 140 for the purpose of finding locations of the mobile devices 128, 130.

The server 140 includes a programmable processor 142 and a memory 144. The functions of server 140 that are described herein are typically implemented in software running on processor 142, which may be stored on tangible, non-transitory computer-readable media, such as optical, magnetic or electronic memory media.

Interferometric Methods for Estimating Angle of Departure

Figure 2:
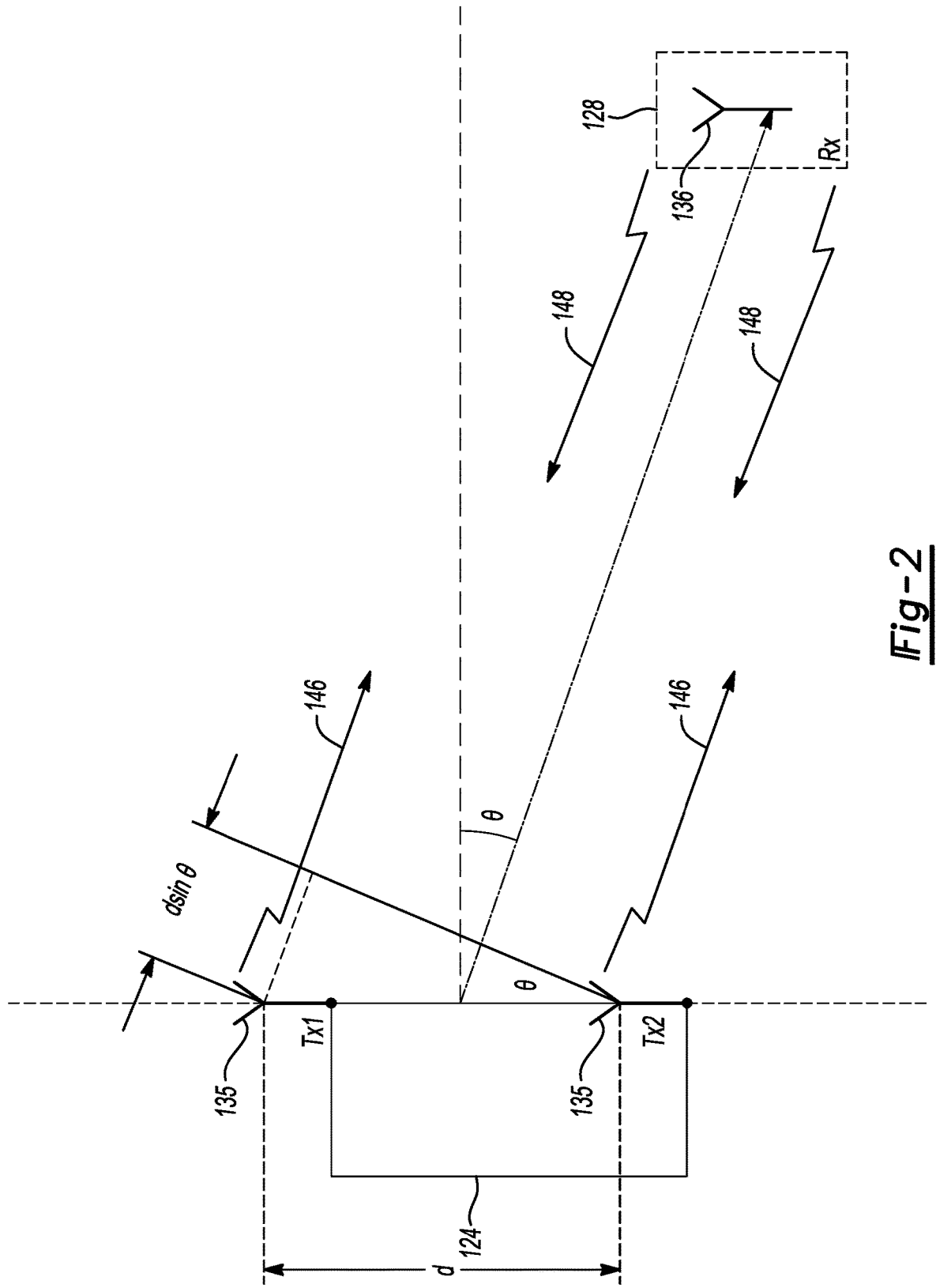
FIG. 2 is a diagram that schematically illustrates a coordinate frame used in deriving an angle of departure or arrival of wireless signals from a transmitter to a receiver, in accordance with an embodiment.

FIG. 2 corresponds to a diagram that schematically illustrates a coordinate frame used in deriving an angle of wireless signals transmitted between access point 124 and mobile device 128, in accordance with an embodiment. This particular pair of an access point and a mobile device is selected purely for convenience, and similar principles will apply to any given pair. Although access point 124 is shown as having two antennas 135 (labeled Tx1 and Tx2), the same geometrical principles apply to access points having three or more antennas arranged in a linear array. The description that follows relates specifically to the angle of departure of downlink signals 146 that are transmitted from antennas 135 of the access point 124 to the mobile device 128; but the principles of this and the subsequent embodiments may similarly be applied in finding the angle of arrival of uplink signals 148 from mobile device 128 that are received by antennas 135.

The antennas 135 define an array axis as the line passing through the bases of the antennas 135. The antennas 135 are separated along the array axis by a known inter-antenna distance d. (The array axis is the line running through antennas 135—shown as a vertical dashed line in FIG. 2.) In wireless access points, for example, the distance d is designed to be a half wavelength, for example, λ/2=6.25 cm at the standard Wireless Local Area Network (WLAN) transmission frequency of 2.4 GHz, wherein λ is the wavelength of the radio signals. Alternatively, transmitters in embodiments thereof may have larger or smaller values of d (and correspondingly, larger or smaller ratios between the inter-antenna distance and the wavelength). The angle of departure θ of the signals from antennas 135 to antenna 136 of the mobile device 128 is taken relative to the normal to the array axis, as shown in FIG. 2. Assuming the distance from access point 124 to mobile device 128 to be considerably greater than d, there will be a difference of d*sin θ in the path length from Tx1 to antenna 36 (referred to as Rx) relative to the path length from Tx2.

As an example, assuming the length of the path from Tx2 to Rx is 6.0000 m, θ=30°, the slightly longer path from Tx1 to Rx will be 6.03125 m. This path difference translates into a 90° phase difference: $\Delta\varphi = d\sin(\pi/6) = (\lambda/2*1)2 = \lambda/4$. The phase difference varies with angle, as well as with the wavelength (or frequency) of transmission.

In general, a receiver such as mobile device 128 measures the carrier phase difference (CPD) between the radio signals received from the different antennas 135 of each of a number of different transmitters (or access points 122, 124, 126) at different locations. Various methods may be applied in measuring the CPD. For example, assuming the radio signals emitted from both of antennas 135 are both modulated with a given sequence of symbols, the mobile device 128 may compute the CPD by identifying a given symbol in the sequence in each of the radio signals that the mobile device 128 receives and measuring the delay in arrival of the given symbol between the radio signals. When the radio signals from both antennas 135 encode identical data using a multi-carrier encoding scheme (such an OFDM scheme) with a predefined cyclic delay between the signals, the known cyclic delay can readily by applied in detecting the phase difference. Techniques of this sort for measuring CPD, and thus the angle of departure, may be disclosed in International Patent Application PCT/IB2017/055514.

As another example, the receiver may detect a predefined training sequence in the radio signals transmitted from antennas 135 and may measure the times at which a certain symbol in the training sequence reaches the receiver from each of the transmitters.

Modern wireless standards may specify certain training fields that are to be transmitted in the preambles of data frames that are transmitted by wireless transceivers, such as the access points 122, 124, 126, and define procedures by which a mobile device 128 or 129 may estimate channel state information between each of the antennas 135 and the antenna 36 based on the training fields in the received radio signals. For example, the preambles of frames that are transmitted in accordance with the IEEE 802.11n standard (as well as later standards in the 802.11 family) include multiple instances of the high-throughput long training field (HTLTF), one for each antenna 135. The receiver processes these fields in order to compute a matrix of complex values of channel state information {CSIi,j}, representing the amplitude and phase of the channel response for each antenna i in each frequency bin j. The difference between the phase components of the CSI for the different antennas 135 in a chosen bin gives the CPD. For example, assuming the access point 124 has two antennas 135 (so that i=0,1):

$$CPD = \angle [CSI]_{(0,j)} - \angle [CSI]_{(1,j)}$$

As a further example, if the receiver (e.g., mobile device 128, 130) itself has multiple antennas 136, it may apply phased detection in distinguishing the signals received from each of antennas 135 of the transmitter (i.e., access point 122, 124, 126), and thus measure the CPD between the signals.

Regardless of the method by which the CPD is measured, it is related to the angle of departure θ (FIG. 2) by the following formula, which expresses an interferometry model:

$$CPD = (2\pi d/\lambda \sin \theta) \bmod 2\pi$$

The ranges of both the angle of departure and the CPD are 0, 2π, but the functional relation is not one-to-one: At least two values of θ transform into the same CPD: If θ is a solution, so is π−θ. When 2d/λ≤1, there are exactly two possible solutions (θ, π−θ mirroring each other along a line crossing the array axis. (Although FIG. 2 shows only a single solution, as a ray extending from access point 124 to mobile device 128, there is, in addition, a second solution mirrored by the line crossing the array axis.) When 2d/λ>1, four or more solutions are possible (as the argument in the modulo exceeds 2π when the sine spans (−1,1]), defining rays emanating from the transmitter. The number of solutions may be even.

Location-Finding Using CPD

Figure 3A:
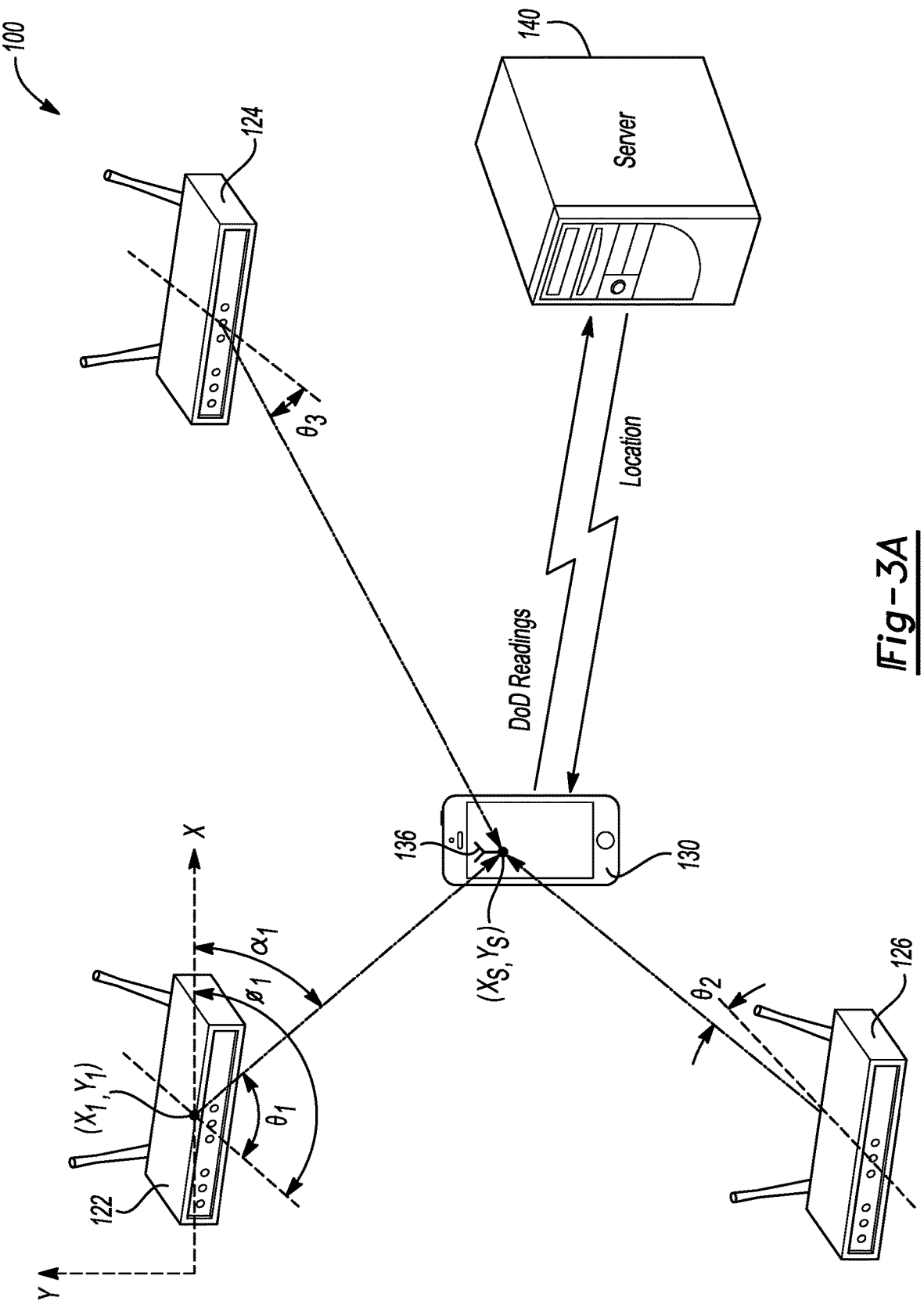
FIG. 3A is a schematic, pictorial illustration of components of the system of FIG. 1 that illustrates a method for finding the location of a mobile communication device, in accordance with an embodiment.

FIG. 3A is a schematic, pictorial illustration of components of the system of FIG. 1, illustrating a method for finding the position of mobile device 130, in accordance with an embodiment. This method assumes that the respective location coordinates (labeled $x_i$, $y_i$) and BSSIDs of access points 122, 124 and 126 have already been mapped by server 140, in a frame of reference indicated by the (X,Y) axes in the figure. The map also indicates a respective orientation angle ($\Phi_i$) for each access point 122, 124, 126, in this case the direction of a normal to the axis of the antenna array of each access point 122, 124, 126. The method of FIG. 3A uses angles of departure in a two-dimensional frame of reference (assuming the access points 122, 124, 126 and mobile device 128, 130 to be in proximity to a common plane, as explained above). Alternatively, this method may use angles of arrival measured by the access points 128, 130; and it may be extended to three dimensions, at the expense of some additional geometrical complication, as explained below.

In some embodiments, the map is constructed on the basis of measurements of angle of departure that were made previously by other mobile devices 128, 130 and/or other input data. The mobile devices 128, 130 in this case report their locations and the estimated angles of departure to server 140, along with respective identifiers of the access points 122, 124, 126, and the server 140 constructs the map accordingly. The server 140 may build this access point map without requiring any cooperation by operators of the access points 122, 124, 126. Alternatively or additionally, the map may incorporate information provided by network operators and/or physical measurements made using dedicated equipment.

In the embodiment of FIG. 3A, the mobile device 130 receives multi-antenna signals from each of the access points 122, 124 and 126. The mobile device 130 extracts the respective angle of departure for each access point, labeled $\theta_1$, $\theta_2$, and $\theta_3$ in the figure, using the techniques described above, along with the respective BSSIDs (or MAC addresses). The mobile device 130 reports these findings via network 138 (FIG. 1) to server 140, which returns corresponding location coordinates. The server 140 may return the location coordinates and orientation angles of the access points $(x_i,y_i, \Phi_i)$, in which case the mobile device 130 can triangulate its own position $(x_s,y_s)$ based on these coordinates and the measured angles of departure. Alternatively or additionally, the mobile device 130 conveys the values of the angles of departure that the mobile device 130 has estimated to server 140, which then computes and returns the location coordinates to mobile device 130.

The location coordinates of mobile device 130 are computed by a process of CPD-based triangulation: Each CPD measurements defines two (or more) loci in a common plane to which access points 122, 124, 126 and the mobile device 130 are in proximity. The loci have the form of rays extending through the plane from the respective location coordinates (xi,yi) of the access points, in the fixed frame of reference of the map, at angles αi, defined by $\Phi_i=\theta_i+\alpha_i$, as given by the respective orientation angle $(\Phi_i)$ and the measured angle of departure $(\theta_i)$ from each of the plurality of the transmitters. The location coordinates $(x_s,y_s)$ of mobile device 130 correspond to an intersection of these rays, as shown in FIG. 3A. As in the case of FIG. 2, the ambiguity in the translation of CPD measurements to angle of departure is omitted from FIG. 3A for the sake of simplicity.

Figure 3B:
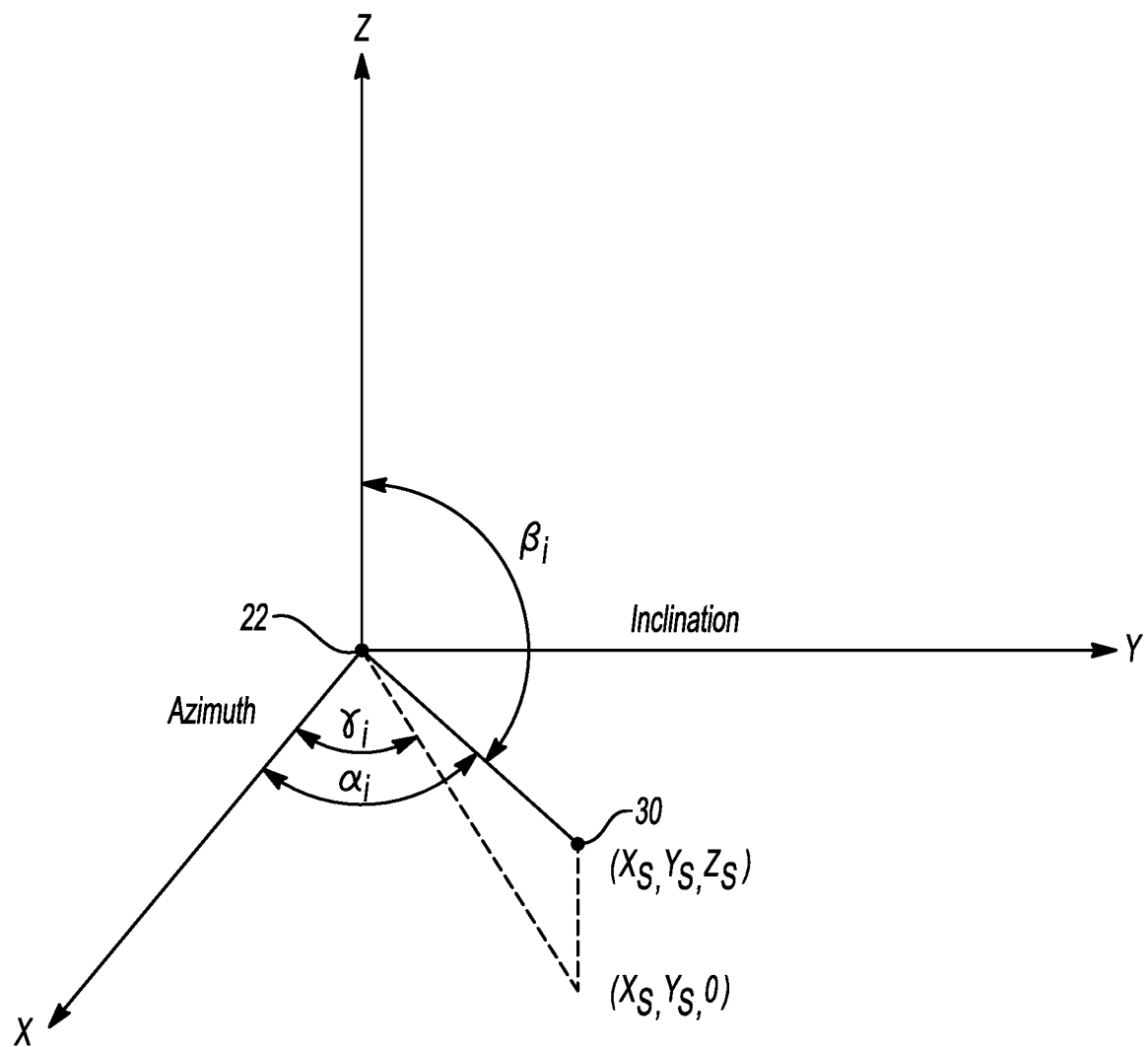
FIG. 3B is a diagram that schematically illustrates a method for finding the location of a mobile communication device in accordance with an embodiment.

FIG. 3B is a diagram that schematically illustrates a method for finding the location of mobile communication device 130, in accordance with an alternative embodiment. In this case, the angles $\alpha_i$, $\Phi_i$ and $\theta_i$ are extended to three dimensions. For example, in a spherical coordinate system, as shown in FIG. 3B, the angle $\alpha_i$ will have both an inclination component βi and an azimuth components $\gamma_i$, which are related by the formula $\cos(\alpha_i)=\sin(\beta_i)\cos(\gamma_i)$. In this case, the loci defined by the CPD values will have the form of curves, rather than linear rays, and the intersection of these curves gives the location of mobile device 130.

Figure 4:
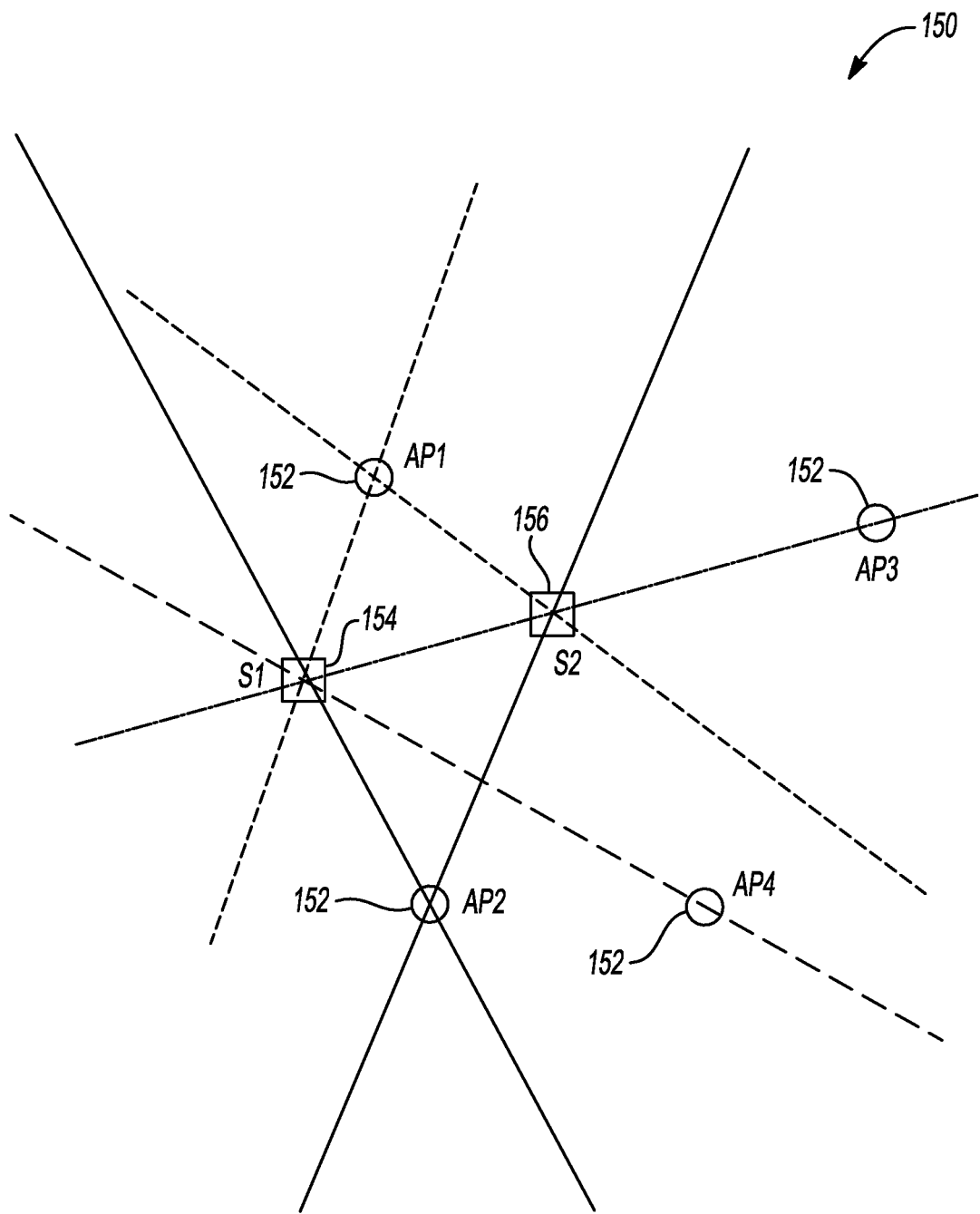
FIG. 4 is a diagram that schematically illustrates a process of location finding based on multiple transmitters in accordance with an embodiment.
Figure 5:
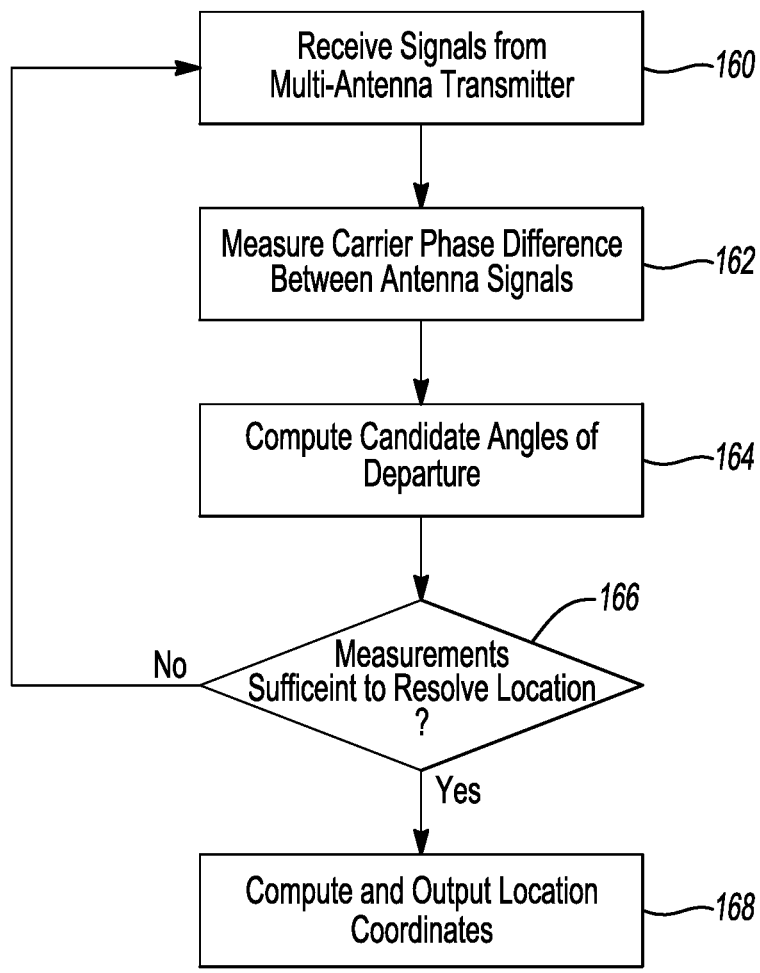
FIG. 5 depicts a method for location finding in accordance with an embodiment.

Reference is now made to FIGS. 4 and 5, which schematically illustrate a method for location finding based on multiple fixed transceivers, in accordance with an embodiment. FIG. 4 is a geometrical diagram of an area 150 showing the locations of fixed transceivers marked as transmitters 152 in the area (marked AP1, AP2, AP3, AP4), while FIG. 5 is a flow chart showing operations in the method. For simplicity of illustration, FIG. 4 assumes a two-dimensional model and shows the loci corresponding to the CPD values as linear rays, corresponding to angles of departure of signals from transmitters 152 to the receiver in a mobile transceiver. This method may alternatively be extended to three dimensions and may similar be applied to values of angle of arrival (AoA), using the principles explained above.

The computing steps in this method may be carried out either by a central processor, such as the processor 142 in server 140 (FIG. 1), or by a processor embedded in the receiver, such as in mobile devices 128, 130 or in a distributed fashion among multiple processors. The term "processor," may be defined to include both local and distributed processors running under the control of software, as well as dedicated and programmable hardware-based processing logic.

A receiver, such as the mobile device 130, receives signals from a multi-antenna transmitter, for example AP1, at a signal reception (e.g. see operation 160). The receiver measured the CPD of the received signals in the manner described above, at a CPD measurement operation 162. Based on the formula above, the receiver derives two or more possible angles of departure with respect to the transmitter, at an angle computation step 164. In the example shown in FIG. 4, AP1 is assumed to have an inter-antenna distance d that is larger than the wavelength of the radio signals transmitted by AP1, $2d/\lambda>1$. The CPD measured for AP1 therefore gives rise to four candidate angles of departure, which are represented by the four rays emanating from AP1 in the plane of the figure (two pairs of rays, with the two rays in each pair pointing in opposite directions, 180° apart).

In formal terms, each of the rays has a slope $a_i=\tan\alpha_i$ in the frame of reference of the map, wherein $\Phi_i=\theta_i+\alpha_i$, as shown in FIG. 3A. Assuming AP1 to be located at known coordinates $(x_i,y_i)$ and the receiver to be at unknown coordinates $(x_s,y_s)$, each of the rays defines a corresponding linear equation: $y_i=a_i(x_i-x_s)+y_s$. The mobile device 130 or the server 140 (depending on where the location-finding process is carried out) checks whether the measurements and corresponding equations that have been assembled thus far are sufficient to resolve the location of mobile device 130 unambiguously, at a measurement assessment operation 66. If not, the process returns to operation 160, and the measurements and computations are repeated over additional transmitters.

FIG. 4 illustrates the situation at operation 166 after a number of successive iterations. After receiving signals and finding the candidate angles of departure from AP1, AP2 and AP3, there are still two possible locations 154 and 156 of mobile device 130, labeled S1 and S2. The processor will thus conclude at operation 166 that further measurements are required and will seek to receive signals from yet another transmitter at operation 160, in this case AP4. These signals indicate unambiguously that the mobile device is located at S1. The processor will then compute and output the location coordinates of the mobile device 130, at a location output operation 168. Alternatively, the mobile device 130 may collect and process signals from a larger number of transmitters, if available, which will result in an overdetermined set of equations, but can be used to increase the measurement accuracy.

Modem

Figure 6:
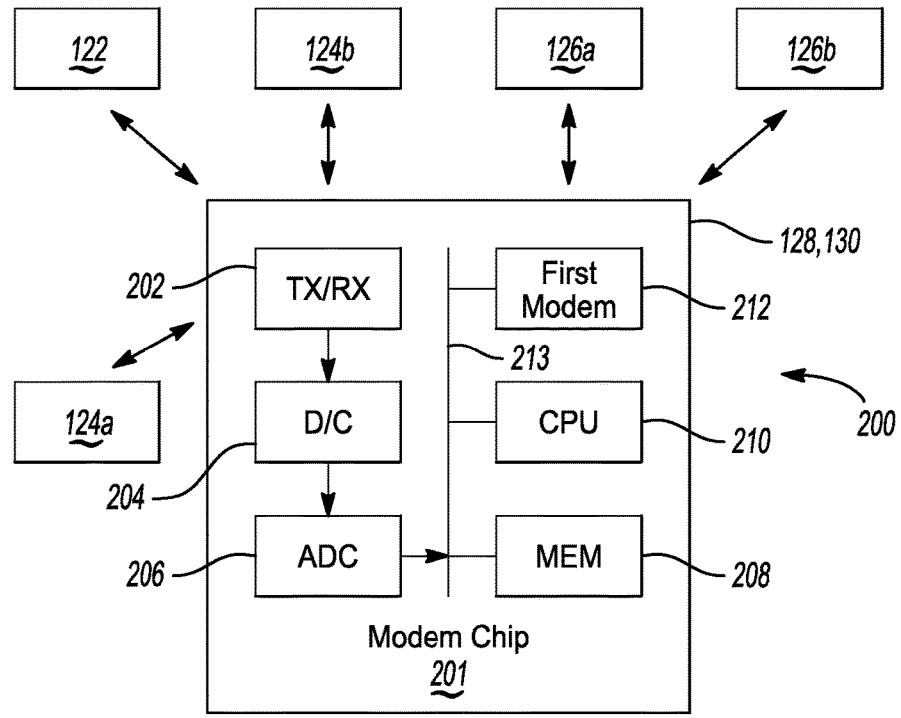
FIG. 6 depicts an example of a wireless communication system in accordance to one embodiment.

FIG. 6 depicts an apparatus 200 that may be implemented in the wireless communication system 100 of FIG. 1 in accordance to one embodiment. For purposes of description, it can be assumed that the access point 122 may communicate with the mobile device 128 (or 130) (hereafter "128" for brevity unless otherwise stated) over a first communication network (e.g., WIFI network A, channel 1 @ 2.4 GHz), that the access points 124a and 124b may communicate with the mobile device 128 over a second communication network (e.g., WIFI network B @ channel 6 @2.4 GHz), that the access point 126a may communicate with the mobile device 128 over a third communication network (e.g., a Long-Term Evolution (LTE) network A @ 1.9 GHz) and that the access point 126b may communicate with the mobile device 128 over a fourth communication network (e.g., LTE network B @ 1.9 GHz).

The mobile device 128 generally includes a modem 201 (or modem chip (e.g., integrated chip (IC), etc.)). The modem 201 generally facilitates converting analog information as received from the access points 122, 124, 126 into digital information. The modem 201 includes a transceiver 202, a downconverter 204, an analog to digital converter (ADC) 206, memory 208, and at least one central processing unit (CPU) (or at least one controller) 210. A dedicated modem chip 212 (or sub-modem) may also be provided on the modem 201. In this case, the dedicated modem chip 212 may correspond to, for example, an LTE based modem to enable communication with the various LTE based networks or associated access points. A bus 213 facilitates the transmission of data between the ADC 206, the memory 208, and the controller 210. In one example, the bus 213 may be an Advanced Microcontroller Bus Architecture (AMBA) bus that may be employed in a system-on-a-chip (SoC) design.

It is recognized that the modem 201 generally facilitates communication, for example, any number of communication networks (e.g. WiFi and LTE based networks). At least two spatially overlapping network types (e.g., a first LTE network and a second LTE network) that are owned by different service providers that the mobile device 128 has no service contracts with (i.e., needs a contract with the LTE operator of a backhaul), hence may not interact with. In addition, a large collection of foreign WiFi networks, the mobile device 128 has no access to, may be spectrally spread across, for example, the ISM 2.4 GHz band. It may be desirable for the mobile device 128 to process information as received via the first or second communication network (e.g., WiFi) as opposed to the third or fourth communication network (e.g., LTE) for providing signal components such as Long Training Field (LTF) information to the controller 210 for the purpose of, but not limited to, determining an angle of departure for first and second signals that are transmitted from any one or more of the access points 122, 124, 126.

Assuming, as stated earlier, that the dedicated modem 212 generally corresponds to an LTE based modem, it may be desirable to divert (or bypass) the flow or transmission of information as received from any of the access points 122, 124, 126 at predetermined instances from being received at the dedicated modem 212. For example, the apparatus 200 may process data in the WiFi format to provide locationing functionality. The apparatus 200 may enable processing the data in the WiFi format without any hardware modifications. Specifically, the apparatus 200 may utilize various aspects of the hardware that may not have been used for the purpose of performing such processing in WiFi. This will be discussed in more detail below.

The apparatus 200 may hop between WiFi and LTE processing and generally sets out to provide a locationing capability utilizing the WiFi format (or with data that is transmitted via the access points 122, 124, 126 in the WiFi format). In general, the downconverter 204 is protocol agnostic and can receive signals in either the WiFi or LTE format. The downconverter 204 may be tuned to a center frequency of the received signal of interest which may be different between LTE licenses and WiFi (e.g., unlicensed, ISM). Generally, the controller 210 may administer the downconverter 204 and set the center radio frequency (RF) frequency as required. Normally, the downconverter 204 is tuned to receive an LTE carrier signal from the access points 122, 124, 126. Aspects of the disclosure generally provide for a reprogramming of the controller 210 with instructions, that when executed by the controller 210 provide for a reprogramming of various hardware registers of the down converter 204. This may entail re-tuning the downconverter 204 to the corresponding WiFi channel in the 2.4 GHz band. Additional parameters may be re-tuned in response to the controller 210 executing the instructions. For example, such additional parameters may include, but not limited to, radio frequency (RF) gain, channel bandwidth, and a sampling rate. In the WiFi mode of operation, the bandwidth may be set to, for example, 20 MHz and the sampling rate may be set to 20 Mega complex samples per second. In attempting to process information in the WiFi format to provide the location capability with the components illustrated in FIG. 2, such a condition may increase processing load for the controller 210. To mitigate this issue, the controller 210 may take advantage of Beacon packets that are generally inserted in the WiFi based signal to reduce computational load of the controller 210.

It may be necessary to downconvert frequencies associated with LTE and WiFi. For example, high frequency signals, typically above 100 MHz may not be sampled directly due to technical limitations such as, for example, the circuitry may not be fast enough. The electronics may be incapable of capturing analog signals that rapidly vary in time. For example, 100 MHz signals require capturing time intervals smaller than 10 nano seconds. Further, the captured analog signals may be quantized to typically 12 data bits (i.e., quantized to one of $2^{12}=4096$ threshold levels) which may be challenging at rates faster than 100 Mega samples per second. Typically, the bandwidth of the signals at hand may be smaller than the highest frequency component of the signal. For example, a 20 MHz WiFi signal at channel 36 populates frequencies between 5170 MHz and 5190 MHz. Instead of sampling a bandwidth of 5190 MHz, the signal may be downconverted to Zero IF into a signal populating frequency between −10 and +10 MHz. This baseband signal may be sampled at a rate of 20 Mega complex samples per second. Thus, downconversion may solve both the issues associated with analog capture and digital conversion.

The apparatus 200 (i.e., the downconverter 204) may perpetually switch between LTE and WiFi. The transceiver 202 receives the LTE based information at, for example, 1.9 GHz or other suitable frequency. The transceiver 202 provides such information to the downconverter 204. In turn, the downconverter 204 (or the zero_IF 204) provides a baseband, either the LTE signal or the WiFi signal are each converted to baseband. When receiving and processing the current beacon packet in the WiFi mode, the next beacon packet epoch may be determined. In a time period between the reception of the current beacon packet at the apparatus 200 and the next beacon transmission (based on the beacon epoch), the apparatus 200 processes this small amount of data. This may require more time than real-time, given the CPU power on chip. If the received thread is cut, the downconverter 204 may, for example, continuously receive WiFi for at least one Beacon Interval of typically 102.4 ms and reacquire contact with beacon epochs of the access points 122 for example.

When the apparatus 200 is tuned to a WiFi band, it is generally desirable to bypass (or prevent) the dedicated modem 212 from receiving this information. Rather, it may be preferable for such received information in the WiFi mode to be transmitted directly to the memory 208 (i.e., for storage) to enable the controller 210 to access and process such information. For example, the downconverter 204 generates an output that is in the form of samples that are complex numbers called a complex envelop. This raw data may be fed to the dedicated modem 212 (e.g. an LTE modem) when an LTE based signal is received or to the memory 208 when the WiFi based signal is received. The controller 210 processes the data from the memory 208 after the memory 208 receives the raw data. To ensure that the above condition is met, particularly in relation to ensuring that the WiFi based samples are transmitted directly to the memory 208 and not to the dedicated modem 212, the apparatus 200 incorporates a bus 213 which may by nature facilitates read and write access to data on the bus to all attached devices. In this case, the bus 213 may be implemented as an AMBA bus to cause the samples received in the WiFi format to be transmitted directly to the memory 208 after being received and downconverted.

In general, code may be stored in memory 208 and/or the controller 210 that facilitates the bypass or prevents the WiFi based samples from being transmitted to the dedicated modem 212 (e.g., ensures the transmission of WiFi beacons to the memory 208 for access by the controller 210). Such code may be part of the code that may be stored in the controller 210 (and/or memory 208) and provides for a reprogramming of various hardware registers of the down converter 204 as noted above. The code, when executed by the controller 210 may engage (or program) the AMBA bus 213 (or other suitable variant thereof) to provide the WiFi based samples directly to the memory 208 and then to the controller 210 via the memory 208 to support locationing functionality. This aspect may negate the use of performing a hardware change to the modem 202. For example, the reprogramming of the controller 210 may also enable the ADC 206 to locally transmit data as received on a WiFi signal directly to the memory 208 for access by the controller 210 as opposed to such data being delivered to the dedicated modem 212. The controller 210 reprograms the ADC 206 to change the address for the delivery of WiFi data from the dedicated modem 212 to an address for the memory 208. The controller 210 may then access the WiFi data from the memory 208 to process such information. The AMBA bus 213 is generally used for the limited purpose of calibration of the ADC 206 (i.e. when the apparatus 200 is in a calibration mode). However, an advantage recognized by the disclosed implementation is the utilization of the AMBA bus 213 to transfer real WiFi based data directly to the memory 208 for processing by the controller 210 to enable the apparatus 200 to providing locationing capability. The AMBA bus 213 generally prevents the downconverter data samples from being transmitted to the dedicated modem 212.

In general, the modem 200 may perform any of the locationing aspects as disclosed herein in addition to any of the providing wireless applications based on locationing solutions as disclosed herein in addition to various wireless applications that include, but not limited to, mobile device payments, mobile chain of custody, and mobile parcel management based on the locationing aspects.

Propagation Time Measurement Scheme (Time of Flight)

Determining the Location of a Receiver

Figure 7:
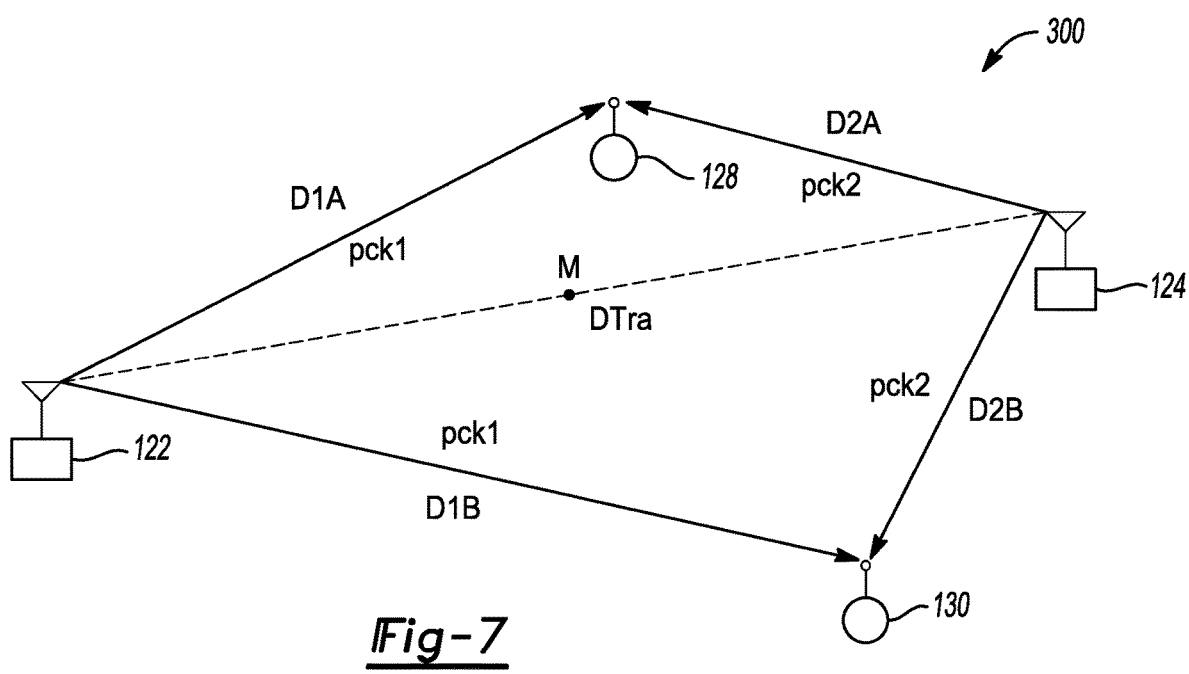
FIG. 7 depicts an apparatus that may be implemented in the wireless communication system of FIG. 6 in accordance to one embodiment.

FIG. 7 generally depicts a first system 300 for determining the location of any one of the mobile devices 128 or 130 relative to the access points 122, 124, 126 in accordance to one embodiment. In the example identified with the first system 300, the access points 122, 124, 126 may generally be defined as transmitters 122, 124, 126 and the mobile devices 128, 130 may generally be defined as receivers 128, 130. The location of the receiver 128 or 130 and the location of the transmitters 122, 124, 126 are known prior to determining the location of the other receiver 128 or 130. The mobile device 128, 130 cooperate in pairs such that each mobile device 128, 130 determines its corresponding location. It is recognized that the mobile device 128, 130 may be passive in that such devices 128, 130 may determine their respective locations based on transmissions from the access points 122, 124, 126 and that it may not be necessary for the mobile devices 128, 130 to transmit data to the access points 122, 124, 126 to determine their respective positions.

The transmitters 122, 124, 126 (e.g., the access points 122, 124, 126) and the receivers (e.g., the mobile devices 128, 130) may employ autonomous, inaccurate clocks. In other words, each of the transmitters 122, 124, 126 and the receivers 128, 130 employ controllers 210 that operate at different clocks (or clock cycles). In order to overcome the inaccurate clocks, the receivers 128, 130 operate in pairs such that each of the receivers 128, 130 receive a first packet (e.g., PCK1) from the transmitter 122 and a second packet (e.g., PCK2) from the transmitter 124. It is recognized that the receivers 128, 130 receive the second packet PCK2 shortly after such receivers 128, 130 receive the first packet PCK1. The following explanation employs a pair of transmitters that transmit information. In FIG. 3, a total of three transmitters 122, 124, and 126 are illustrated. Thus, the below process is employed for each pair of transmitters (e.g., first pair of transmitters 122, 124, second pair of transmitters 122, 126, and third pair of transmitters 124, 126). This will be discussed in more detail in connection with FIG. 10.

The receiver 128 estimates the time of arrival of the first packet PCK1 and the second packet PCK2 utilizing its own internal clock based on the following:

$$t_{pck1} + \frac{D_{1A}}{c} + t_A \text{ and } t_{pck2} + \frac{D_{2A}}{c} + t_A \text{ for } PCK1 \text{ and } PCK2, \quad \text{(Eq. 1)}$$

respectively.

The receiver 128 calculates (or determines) the first difference in time of arrival (e.g., first difference) between the first packet PCK1 and the second packet PCK2 based on the following:

$$\Delta t_A = t_{pck2} - t_{pck1} + \frac{D_{2A} - D_{1A}}{c} \text{ which is independent} \quad \text{(Eq. 2)}$$

of local receiver clock $t_A$ for the receiver 128, where $c$ corresponds to the speed of light.

Similarly, the receiver 130 estimates the time of arrival of the same first packet PCK1 and the same second PCK2 utilizing its own internal clock based on the following:

$$t_{pck1} + \frac{D_{1B}}{c} + t_B \text{ and } t_{pck2} + \frac{D_{2B}}{c} + t_B \text{ for } PCK1 \text{ and } PCK2, \quad \text{(Eq. 3)}$$

respectively.

The receiver 130 calculates (or determines) the difference in time of arrival (e.g., the second difference) between the first packet PCK1 and the second packet PCK2 based on the following:

$$\Delta t_B = t_{pck2} - t_{pck1} + \frac{D_{2B} - D_{1B}}{c} \text{ which is independent} \quad \text{(Eq. 4)}$$

of local receiver clock $t_B$ for the receiver 130.

Therefore, the final difference between the first difference and the second difference may be found as follows:

$$\Delta t_{BA} = \Delta t_B - \Delta t_A = \frac{(D_{2B} - D_{1B}) - (D_{2A} - D_{1A})}{c}. \quad \text{(Eq. 5)}$$

Figure 8:
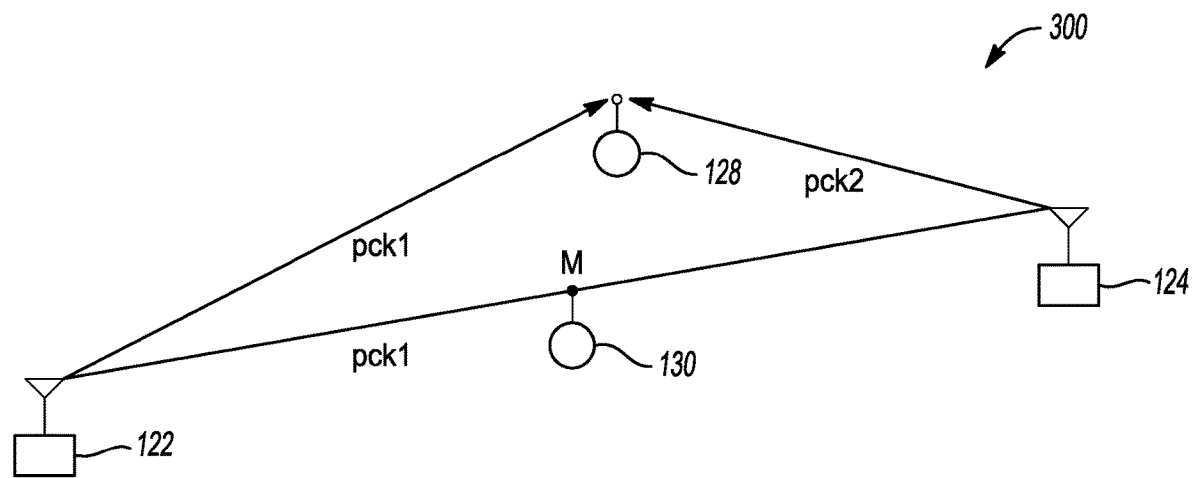
FIG. 8 generally depicts a first system for determining the location of any one of the mobile devices relative to the access points in accordance to one embodiment.

FIG. 8 generally depicts another aspect related to the first system 300 for determining the time of arrival in accordance to one embodiment. The receiver 130 is positioned at a location that is half-way between the transmitter 122 and the transmitter 124. In general, the second difference (see. Eq. 5) as determined by the receivers 128, 130 is generally equal to a time difference between the transmitted first and second packets (e.g., PCK1 and PCK2) since a propagation delay from the transmitters 122, 124 to the receiver 130 are similar (e.g., D1A=D2A). It is recognized that the embodiment illustrated in FIG. 7 is a general case and the embodiment illustrated in FIG. 8 corresponds to a particular case.

The receiver 128 transmits information corresponding to the time difference between the transmitted first and second packets (e.g., PCK1 and PCK2) to the receiver 130 and/or to the server 140. In one example, the receiver 128 transmits such information to the receiver 130 over a potentially poor-quality network. In other words, the receivers 128, 130 share their respective readings over a backhaul which may be of a high, unpredictable latency. In general, there may not be any out of the ordinary requirements from the backhaul for the first system 300 to operate as intended. For example, a Narrowband Internet of Things (NB-IoT) or LTE data network may operate well in the first system 300. The receiver 130 subtracts the time difference between PCK1 and PCK2 sent by the transmitters 122, 124 respectively as reported by the receiver 128 from its measured time difference. To summarize, the first difference and the second difference performed by the receivers 128, 130, eliminates the unknown local clock skew in the receivers 128, 130. The third difference (or the difference of the differences) eliminates the unknown clock skew between the transmitters 122, 124. The residue is proportional to propagation delays only.

In general, in the case in which the location of the transmitters 122, 124 and the receiver 128 is known, and hence, $D_{2A}-D_{1A}$ and $D_{Tra}=D_{21}$ are known, the receiver 128 transmits $\Delta t_A$ (e.g., the time difference between the first packet (PCK1) and the second packet (PCK2) as transmitted from the transmitters 124 and 126 and received at the receiver 128) to the receiver 130 or server 140 which forwards the reading to the receiver 130. The receiver 130 measures $\Delta t_B$ (e.g., the time difference between the first packets (PCK1) and the second packets (PCK2) as transmitted from the transmitters 122 and 124 and received at the receiver 130) and as per Eq. 5 calculates:

$$\Delta D_B = D_{2B}-D_{1B} = c(\Delta t_A - \Delta t_B) + (D_{2A}-D_{1A}) \quad \text{(Eq. 6)}$$

Figure 9:
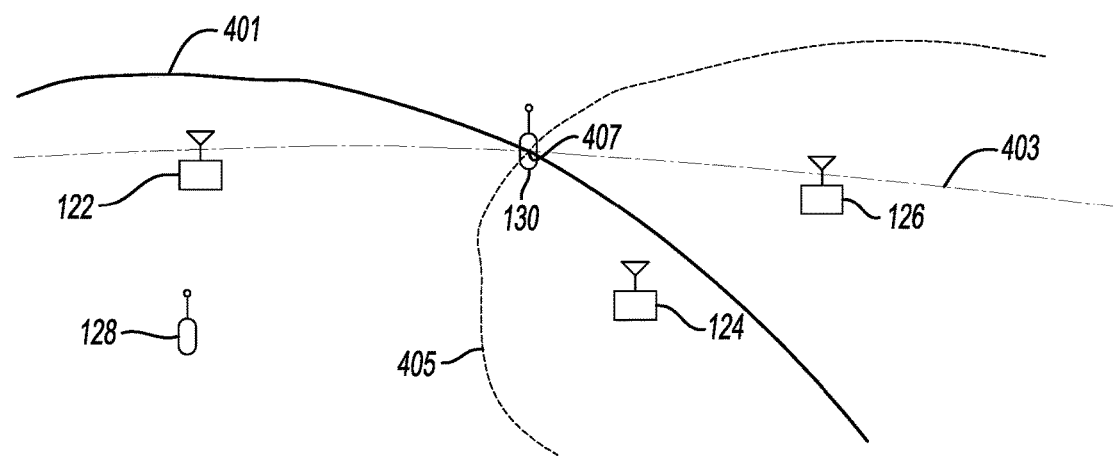
FIG. 9 generally depicts a location of the receiver in relation to a plurality of hyperbolas in accordance to one embodiment.

FIG. 9 generally depicts that the location of the receiver 130 may be a point on a singular hyperbola having a foci at the transmitter 124 and at the transmitter 126 with an eccentricity of:

$$e = \frac{D_{Tra}}{\Delta D_B} \quad \text{(Eq. 7)}$$

Where $D_{Tra}$ is the distance between the transmitters 124 and 126 (the foci) as the location of these transmitters 124 and 126 and the receiver 128 are known.

Generally, FIG. 9 depicts identifying three hyperbolas that intersect a single point. Each hyperbola is associated with location information associated with pairs of transmitters (e.g., transmitters 122, 124; transmitters 122, 126; and transmitters 124 and 126) and the receiver 128. The hyperbolas and pairs of transmitters will be discussed in more detail below.

Figure 10:
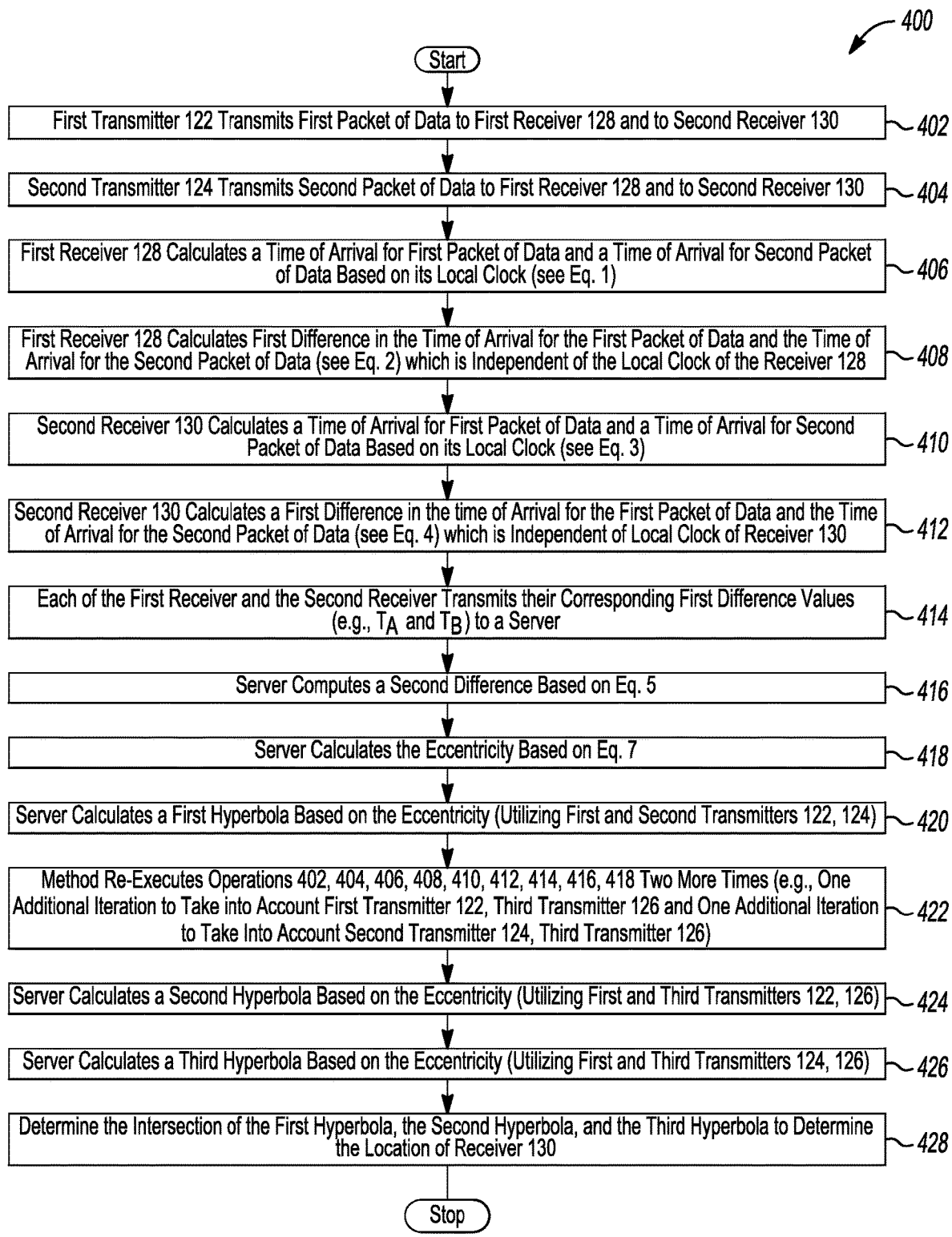
FIG. 10 depicts a method for determining a location of the receiver in accordance to one embodiment.

FIG. 10 depicts a method 400 for determining a location of the receiver 130 in accordance to one embodiment of the present invention. The method 400 generally employs the TOF techniques as set forth in FIGS. 7-9 as noted above. For the method 400, the location of the transmitters 122, 124, 126 and the receiver 128 is known to the server 140. The method 400 utilizes the location of the transmitters 122, 124, 126 and the receiver 128 to determine the location of the receiver 130.

For operations 402, 404, 406, 408, 410, 412, 414, 416, and 418, the method 400 utilizes location information for the two transmitters 122, 124 and the receiver 128 to determine a first hyperbola. The foregoing noted operations 402, 404, 406, 408, 410, 412, 414, 416 are re-executed two more times to take into account location information for the following transmitter pairs: 122, 126 and 124, 126 with the same receiver 128.

In operation 402, the first transmitter 122 transmits a first packet of data (e.g., a WiFi based signal) to the first receiver 128 and to the second receiver 130.

In operation 404, the second transmitter 124 transmits a second packet of data (e.g., a WiFi based signal) to the first receiver 128 and to the second receiver 130.

In operation 406, the first receiver 128 calculates a time of arrival for the first packet of data and a time of arrival for the second packet of data based on its local clock (see Eq. 1 above).

In operation 408, the first receiver 128 calculates the first difference in the time of arrival for the first packet of data and the time of arrival for the second packet of data (see Eq. 2) which is independent of the local clock of the receiver 128.

In operation 410, the second receiver 130 calculates a time of arrival for the first packet of data and a time of arrival for the second packet of data based on its local clock (see Eq. 3 above).

In operation 412, the second receiver 130 calculates the first difference in the time of arrival for the first packet of data and the time of arrival for the second packet of data (see Eq. 4) which is independent of the local clock of the receiver 130.

In operation 414, each of the first receiver 128 and the second receiver 130 transmits their corresponding first difference values to the server 140. It is recognized that the first receiver 128 may alternatively transmit its corresponding first difference value to the second receiver 130.

In operation 416, the server 140 (or the second receiver 130) computes a second difference based on Eq. 5.

In operation 418, the server 140 (or the second receiver 130) calculates the eccentricity based on Eq. 7.

In operation 420, the server 140 (or the second receiver 130) calculates a first hyperbola 401 (see FIG. 9) based on the eccentricity as determined in operation 418 and on the location of the transmitters 122, 124, the loci of the hyperbola. In general, to determine the first hyperbola, the eccentricity need be known in addition to the location (loci) of the transmitters 122 and 124. As noted above, the location of the transmitters 122 and 124 are known. Therefore, it is possible to determine the loci and the distance between the transmitters 122 and 124 and calculate e.

In operation 422, the method 400 re-executes operations 402, 404, 406, 408, 410, 412, 414, 416, and 418 two more times. As noted above, the first time that method 400 was executed, information corresponding to the location of the transmitters 122, 124 was utilized. However, it is necessary to investigate all of the transmitter pairs to determine the location of the receiver 130. Thus, the second time operations 402, 404, 406, 408, 410, 412, 414, 416, and 418 are executed, information corresponding to the location of the transmitters 122 and 126 are employed. Further the third time operations 402, 404, 406, 408, 410, 412, 414, 416, and 418 are executed, information corresponds to the location of transmitters 124 and 126 are employed.

In operation 424, the server 140 (or the second receiver 130) calculates a second hyperbola 403 (see FIG. 9) based on the eccentricity as determined in operation 418 and on the distance between the transmitters 122 and 126.

In operation 426, the server 140 (or the second receiver 130) calculates a third hyperbola 405 (see FIG. 9) based on the eccentricity as determined in operation 418 and on the distance between the transmitters 124 and 126.

In operation 428, the server 140 (or the second receiver 130) determines (or locates) a location 407 which corresponds to a point (or intersection) in which the first hyperbola 401, the second hyperbola 403, and the third hyperbola 405 intersect. The server 140 identifies the location 407 as the location of the second receiver 130.

The foregoing solution may be part of the Hyperbolic Navigation Time Difference of Arrival (TDOA) family that can withstand or survive inaccurate WiFi clocks as noted above. Each measurement may provide a corresponding curve or a hyperbola as detailed above. Three such measurements provide a unique solution. Other techniques such as interferometry which may define straight lines that originate at the same transmitter locations (loci), as referenced above, as the loci can be used to intersect with the above hyperbolas and interferometry lines and provide a robust location estimation for an unknown receiver (and an unknown transmitter as discussed below in a dual constellation).

Determining the Location of a Transmitter

Figure 11:
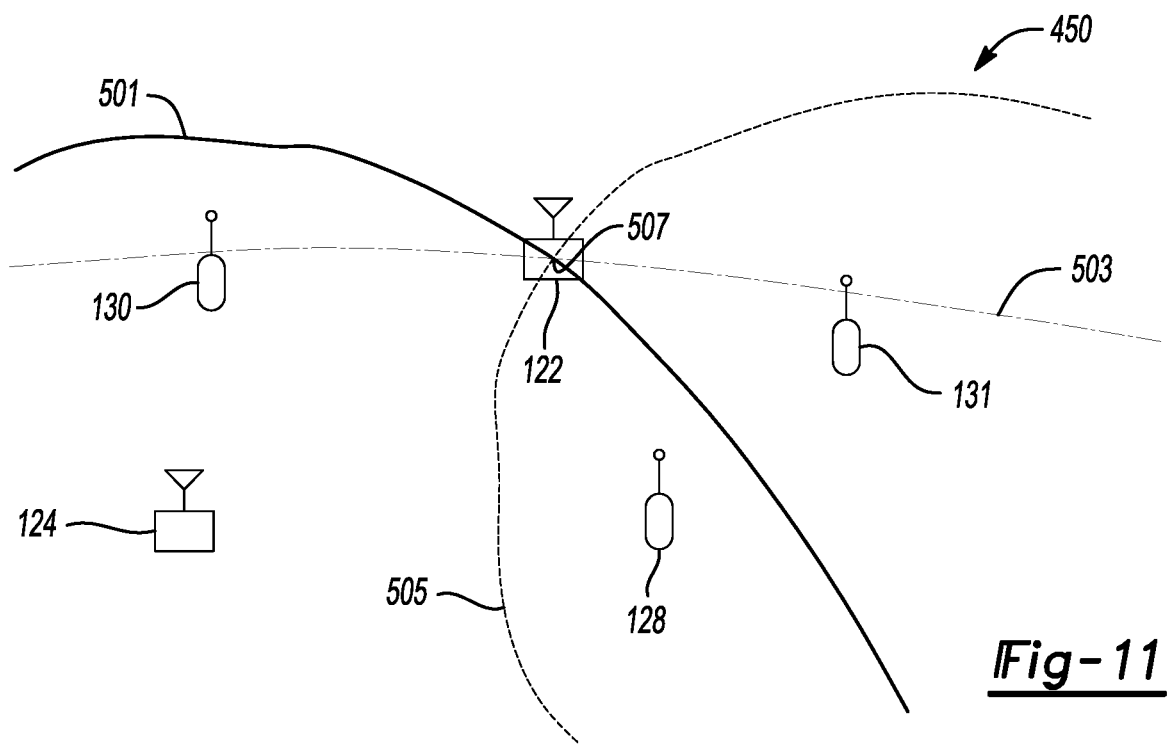
FIG. 11 depicts a second system for determining the location of any one of the transmitters relative to the mobile devices in accordance to one embodiment.

FIG. 11 generally depicts a second system 450 for determining the location of any one of the transmitters 122 or 124 relative to the receivers 128, 130, and 131 in accordance to one embodiment. For purposes of illustration, the location of the transmitter 124 and the receivers 128, 130, 131 are known. Thus, it is desirable to determine the location of the transmitter 122.

The similar analysis as applied in connection with the first system 300 as detailed in connection FIGS. 9 and 10 may be applied to FIG. 11. However, instead of determining the location of the second receiver 130 based on the known location of the first receiver 128 and the transmitters 122, 124, and 126 as set forth in the first system 300, the second system 450 determines the location of the first transmitter 122 based on the known locations of the second transmitter 122, the first receiver 128, the second receiver 130, and the third receiver 131. FIG. 11 illustrates a spatial arrangement of the first transmitter 122, the first receiver 128, the second receiver 130, and the third receiver 131 with respect to the second transmitter 124. It is recognized that the disclosure and various equations as set forth in connection with FIGS. 9 and 10 also apply to the manner in which the location of the first transmitter 122 is determined with various receivers 128, 130 of FIG. 9 being replaced with the transmitters 122, 124 of FIG. 11 and the transmitters 122, 124, 126 of FIG. 9 being replaced with the receivers 128, 130, 131 of FIG. 11.

FIG. 11 illustrates a similar spatial relationship to that illustrated in FIG. 9 with the exception being the placement of the second transmitter 124, the first receiver 128, the second receiver 130, and the third receiver 131 with respect to the first transmitter 122. For example, FIG. 11 depicts that the second receiver 130 replaces the position of the first transmitter 122 as shown in FIG. 9, that the second transmitter 124 replaces the position of the first receiver 128 as illustrated in FIG. 9, that the first receiver 128 as illustrated in FIG. 11 replaces the position of the second transmitter 124 as illustrated in FIG. 9, that the third receiver 131 of FIG. 11 replaces the position of the third transmitter 126 of FIG. 9. FIG. 11 has been illustrated in the manner noted above for purposes of brevity and will not restate the corresponding disclosure and equations also for purposes of brevity.

Thus, in the case as noted above where the location of the first receiver 128, the second receiver 130, and the second transmitter 124 are known, hence the following may be provided:

$D_{2A}$–$D_{2B}$ and $D_{Rec}$=$D_{AB}$ are known (see FIG. 7), the first receiver 128 reports $\Delta t_A$ to the second receiver 130, and the second receiver 130 measures $\Delta t_B$ and calculates:

$$\Delta D_1 = D_{1A} - D_{1B} = c(\Delta t_A - \Delta t_B) + (D_{2A} - D_{2B}) \qquad \text{(Eq. 8)}$$

The location of the first transmitter 122 is a point on a singular hyperbola the foci of which are $Rec_A$ and $Rec_B$ with eccentricity of:

$$e = \frac{D_{Rec}}{\Delta D_1} \qquad \text{(Eq. 9)}$$

The server 140 may perform the calculation of determining the eccentricity. Further, as similarly noted above, the server 140 may calculate the hyperbola for each pair of receivers (e.g., receivers 128, 130; receivers 128, 131; receivers 130, 131)). The server 140 calculates a first hyperbola 501 (see FIG. 8) based on the eccentricity as determined in Eq. 9 and on the distance between the receivers 128, 130. In general, to determine the first hyperbola, the eccentricity need be determined, in addition to the knowledge of the location of the receivers 128, 130, the loci of the hyperbola. As noted above, the location of the receivers 128 and 130 are known.

The server 140 calculates a second hyperbola 503 (see FIG. 11) based on the eccentricity as determined from Eq. 9 and on the location of the receivers 128 and 131. The server 140 calculates a third hyperbola 505 (see FIG. 11) based on the eccentricity as determined from Eq. 9 and on the distance between the receivers 130 and 131. The server 140 (or the second receiver 130) calculates a third hyperbola 405 (see FIG. 9) based on the eccentricity as determined from Eq. 9 and on the distance between the receivers 130 and 131.

The server 140 (or the second receiver 130) determines (or locates) a location 507 which corresponds to a point in which the first hyperbola 501, the second hyperbola 503, and the third hyperbola 505 intersect. The server 140 identifies the location 507 as the location of the first transmitter 122.

Calibration to Account for Time Drift Between Receivers

Prior to determining the location of the receiver or the transmitter, it is recognized that a calibration occurs to account for a time drift between the receivers 128, 130, and 131. In reference to the receivers 128, and 130, the time differences measured by the receivers 128, 130 (e.g., $\Delta tA$, ΔtB) are clocked locally. However, the time differences may be affected by a local drift between a corresponding local clock for the receiver 128 and for the receiver 130. For example, the clocks for the receiver 128 and the receiver 130 are not synchronized with one another and a time drift may occur between such receivers 128 and 130. In one example, the time drift may correspond to one second every hour, e.g., after one hour of the clock for the receiver 128, and the clock for the receiver 128 will be ahead of the clock for the receiver 130, by one second. The local clock drift between the receivers 128, 130 may be compensated for by using two packet transmissions α, β from a single transmitter 122 for example. Alternatively, transmitters 124 or 126 may also be used for this purpose. The two packet transmissions α, β are received by both the receivers 128 and 130. Each of the receivers 128, 130 compute the time difference between packet arrivals, which is location invariant, since both packets travel the same distance to a particular receiver 128 or 130. The receivers 128, 130 report the time distance between packet arrivals to the server 140.

The server 140 calculates the ratio $$r = \frac{T_{A\alpha} - T_{A\beta}}{T_{B\alpha} - T_{B\beta}} \quad \text{(eq. 10)}$$

that is used by the receiver 128 to compensate for time differences measured by the receiver 130. The server 140 calculates r^(−1) that is used by the receiver 130 to compensate for time differences measured by the receiver 128. The server 140 provides compensated readings back to the receiver 128 and the receiver 130.

Consider the following example, if transmissions (or signals) α, β are transmitted at Δt=103.461963 msec apart from one another by transmitter 122. The time difference between these events is location independent since both travel the same path, for example, from the location of the transmitter 122 to the location of the receiver 128 and from the location of the transmitter 122 to the location of the receiver 130. Hence, ideally both receivers 128 and 130 estimate the same time difference Δt. Since both local clocks for each receiver 128, 130, respectively, have discrepancies, for example, the receivers 128, 130 may determine a $\Delta t_A^0 = 103.461531 / \backslash a \Delta t_B^0 = 103.461229$, respectively (i.e., $\Delta t_A^0$ to corresponds to the time difference between α, β for the receiver 128 and $\Delta t_B^0$ corresponds to the time difference between α, β for the receiver 130). Therefore, when the receiver 128 receives a time report from the receiver 130 (via the server 140), the receiver 128 may correct future readings of future transmissions (from the receiver 130 as received from the server 140) of $\Delta t_B^1$ to its local time base based on the following:

$$\Delta t_B^{1A} = \Delta t_B^1 * \frac{103.461531}{103.461229} \quad \text{(see Eq. 10)}$$

Additionally, when the receiver 130 receives a time report from the receiver 128 (via the server 140), the receiver 130 may correct for future readings of further transmissions (from the receiver 128 as received from the server 140) based on the following;

$$\Delta t_A^{1B} = \Delta t_A^1 * \frac{103.461229}{103.461531} \quad \text{(see Eq. 11)}$$

Time of Arrival Estimation

The receivers 128, 130 may determine the time of arrival by auto-correlating a received Long Training Field (LTF) symbol (e.g., in connection with a WiFi based signal) as received from the signals (e.g., first and second packets PCK1 and PCK2) transmitted from the transmitters 122, 124, 126. The LTF provides low side lobes and a steep main lobe in the auto-correlation function. However, adjacent symbols of the a particular LTF symbol of interest are non-zero signals which thereby affect the resultant correlation function. For example, LTFs may be transmitted with 2.5 repetitions (e.g., one half of an LTF is sent, then an LTF is sent, and then the LTF is sent again). The resultant auto-correlation comprises multiple peaks.

The free space decorrelation time of the WiFi signal may be 50 ns at a 20 MHz bandwidth. With the WiFi standard, orthogonal frequency division multiplexing (OFDM) based beacons (or packets) may be transmitted at the 20 MHz bandwidth. Typical digital receivers may process the incoming signal at 20 Ms/s (complex) for 20 MHz the channel bandwidth with a decorrelation time of 50 ns corresponding to roughly 15 m, the speed of light. In general, 52 out of the 64 frequency bins may be populated, hence the location resolution may increase to 18.5 meters.

As generally shown in FIG. 1, each transmitter 124, 126 may use a plurality of antennas 135 to transmit the packets (e.g., WiFi, beacons) and each of the transmitters 122, 124, 126 transmit the packets coherently, from the plurality of antennas 135 as opposed to transmitting the packets from a single antenna. Space coding may be applied to overcome black spots (e.g., locations whereby destructive interference annihilates the signal). In various OFDM cases, a Cyclic Delay Diversity (CDD) may be used to transmit different versions of the same signal from the plurality of antennas 135. CDD generally applies to multiple antenna transmission schemes. A superimposed signal as received at each of the receivers 128, 130 (e.g., as received from the transmitters 122, 124, 126) may affect time estimations in different ways. For example, the auto-correlation function of the LTF comprises peaks of equal height, one per antenna element 142. The time difference between peaks amounts to a delay applied in the CDD (e.g., four 50 nsec samples) in the case of two antennas 135 that transmit WiFi based signals (e.g., beacons or packets). It is also recognized that the transmitters 122, 124, 126 may also transmit the packets (e.g., WiFi beacons) via a single antenna 135. If any of the transmitters 122, 124, 126 transmit a packet of data via a single antenna 135, then a CDD may not be applied.

Coarse Time of Arrival Estimation

Figure 12:
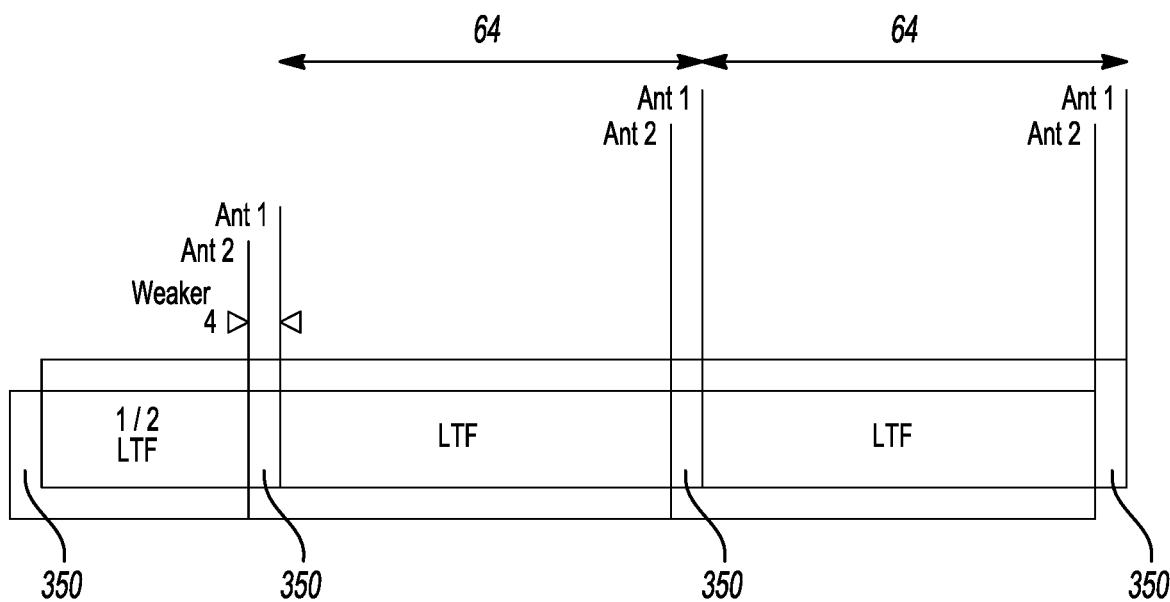
FIG. 12 illustrates a two-antenna implementation on a given transmitter with the cyclic delay diversity.

To determine the time of arrival of various signals received from the transmitters 124, 126, the receivers 128, 130 generally undergo differing detection phases to ascertain a final arrival time of the signals (or packets). In a first phase, each of the receivers 128, 130 perform a coarse time of arrival estimation by analyzing discrete peaks of the auto-correlation with the LTF symbol. For example, specific peaks of the autocorrelation are generally spaced apart at predetermined time intervals from one another, where additionally the amplitude of the peaks at such predetermined time intervals generally corresponds to the envelope of the known autocorrelation of LTF with itself. There may be three factors that create ambiguity in the form of multiple peaks in time:

(a) the linear auto-correlation of a standardized LTF may not be ideal. The ideal function may be Kronecker Delta. In general, low side lobes may be generated by even a single LTF, padded with hypothetical zeroes before and after;

(b) the LTF in the signal retransmitted from the transmitters 122, 124, 126 is sent in repetition (e.g., pursuant to WiFi protocol (or IEEE802.11 for example)), thereby generating two peaks of the same strongest correlation and a few peaks of weaker correlation, 64 samples apart as set forth, for example, in the IEEE802.11 case; and (c) the encoded signals that are transmitted from the transmitters 122, 124, 126 may create an artificial negative delay which provides a resulting peak replication at a negative offset of, for example, 200 nsec (4*50 nsec samples) as illustrated in FIG. 12 (see elements 350) in the case of two antenna legacy mode for each transmitter 122, 124, 126. CDD is generally specific to multiple antenna transmission.

Figure 13:
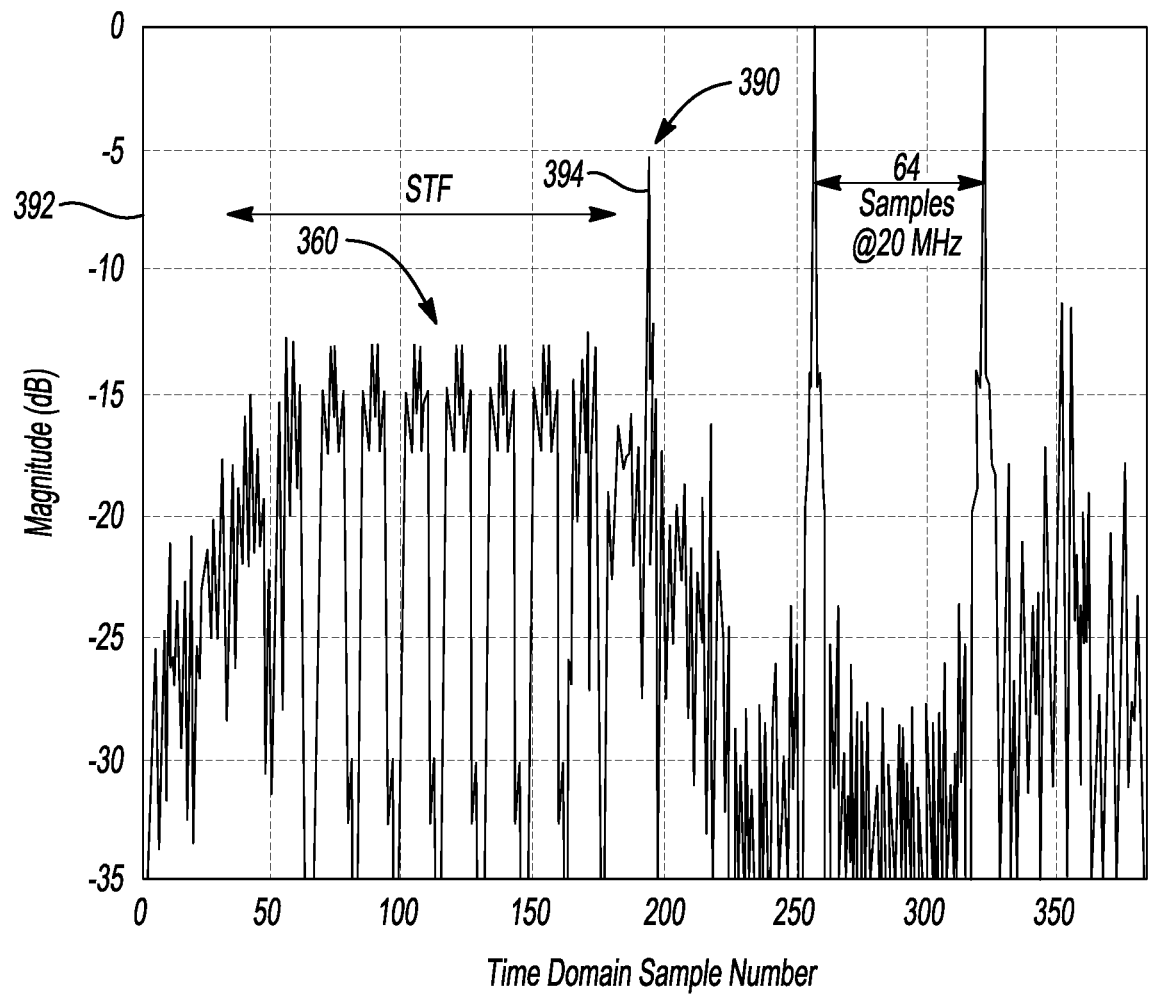
FIG. 13 illustrates a single antenna implementation on a given transmitter.

In general, each receiver 128, 130 is configured to extract the N-strongest (e.g., N=4) auto-correlation peaks within a predetermined time interval for a predetermined duration. This may start at a detected time of a Short Training Field (STF) pattern 360 in the WiFi based signal that is transmitted from the transmitters 122, 124, 126. FIG. 13 generally depicts at least one aspect related to performing the first phase detection (e.g., coarse detection) in accordance to one embodiment. FIG. 13 depicts the STF pattern for the transmitted signal from a single antenna of the transmitter 122, 124. Two transmitted signals from two antennas 135 for a corresponding transmitter 122 or 124 and the corresponding CDD is applied to separate the signals (e.g., again, see elements 350).

The desired peak pattern in a legacy LTF WiFi based signal utilizing the two antenna 135 configuration for each of the transmitters 122, 124, 126, includes each LTF symbol on the incoming signal from the transmitters 122, 124, 126 to include the strongest peaks that are separated by one another by the predetermined amount of time of, for example, T+0, T+4, T+64, or T+68 for arbitrary T. Referring back to FIG. 13, the predetermined peaks (or predetermined time intervals) of T+4 and T+68 may be specific to a multiple antennae transmission scheme (e.g., the utilization of two antennas 135 for a single transmitter 122, 124). The receivers 128, 130 as generally set forth herein may extract T under some arbitrary assumption about the added channel effects (or additional antenna affects since two antennas 135 for a particular transmitter 122, 124, 126 are utilized). For example, additive noise turns stronger than real peaks (e.g., there is no threshold and the peaks are sorted and the N strongest peaks (e.g., N=4) are selected) thereby creating a somewhat different pattern than the noise free pattern, as shown at 394 in FIG. 13. In one example, the two strongest peaks may be separated by a predetermined time interval of any one or more of the following: T+0, T+4, T+50, and/or T+68 (e.g., 64 is not strong enough and 50 is unrelated to the signal, mere additive noise). In another example, the two four strongest peaks may be separated by another predetermined time interval of any one or more of the following: T+4, T+30, T+64, and T+68 (e.g., T+0 is not strong enough and T+30 is mere additive noise). Each of FIGS. 12 and 13 generally illustrate that the two strongest peaks are separated by one another at a predetermined time interval of T+64 (or 64 samples) when only one transmitting antenna is used and no noise is present. Thus, the receiver 128, 130 selects these strongest peaks as peaks of interest for further examination based on the predetermined time interval between such peaks. In the two transmitting antennas case, the receivers 128, 130 may assume, for example, that one of the strongest four received peaks may be noise and another one of the four transmitted peaks is absent (not among the four strongest peaks). Reference is made to four transmitted peaks since each transmitter 122, 124, 126 transmits the signal via two antennas 135 per transmitter 122, 124, 126. FIG. 12 generally illustrates the two antennas 135 implementation on a given transmitter 122, 124, 126 with the CDD and FIG. 13 generally illustrates a single antenna 135 implementation on a given transmitter 122, 124, 126. The implementation in FIG. 13 is provided merely for illustrative purposes. The above provides a coarse estimation of the above epoch (time of arrival) "T".

Precise Time of Arrival Estimation (Discrete)

To determine the time of arrival of various signals received from the transmitters 122, 124, 126, the receivers 128, 130 generally undergo differing detection phases to ascertain a final (or precise or accurate) arrival time of the signals (or packets). As noted above, each of the receivers 128, 130 may perform a coarse time detection scheme. Each of the receivers 128, 130 may also perform a precise time detection scheme of the incoming signal after the coarse time detection scheme is performed. With the precise time detection scheme of arrival, the overall resolution increase may occur by up to, for example, two orders of magnitude, and may be achieved by interpolation. The interpolation may use convolution with samples of sinc( ) (e.g., or alternatively by zero padding the FFT of the samples) that is followed by peak selection of the complex envelope. For example, the interpolation of 32× may result in a resolution of about 58 cm. These methods may be discrete in nature, for example, padding to a quadruple the length of the data may improves the resolution by up to four times. Complexity may increase by the following (n=4 in the example):

$$\frac{1}{2}n\log(n) \qquad \text{(Eq. 12)}$$

So long as a channel delay spread is smaller than 4*50=200 nseconds (about 67 meters), the two CDD peaks will not overlap. A single transmitter detector implementation (e.g., one of the receivers 128 or 130) correlates with $s^*_{LTF}(t)$, * denotes complex conjugate. The two-transmitter detector (e.g., the receiver 128 or 130) may correlate with $$s^*_{LTF}(t)+s^*_{LTF}(t+T_{CDD}) \qquad \text{(Eq. 13)}$$

where * denotes a complex conjugate. Alternatively, a correlator for a single transmitter element (e.g., the transmitter 122, 124, or 126) may be applied, followed by a time window of $$(-100, 50)\left(-\infty, \frac{T_{CDD}}{2} - T_{GI}\right)$$

another time window of $$\left(\frac{T_{CDD}}{2} + T_{GI}, \infty\right)$$

where the guard interval may be set for example to $$\frac{T_{CDD}}{8},$$

and then averaging over the estimations, where $T_{CDD}$ is the known delay introduced between the antennas 135. For example, in a two-antenna based legacy mode, the delay is 4*50 nsec=200 nsec and $T_{GI}$ is a time quantity that is defined to guard against spillover between one antenna 135 to another antenna 135 as used in the selection of a window size as noted above.

In general, if the coarse peak was found at sample 215, the interval [212, 213, ..., 219] comprising eight samples may be interpolated by 32 into 8*32=256 points in time, spaced $$\frac{50 \, nsec}{32} = 1.5625 \, nsec.$$

The peak of the envelope may be the refined time of arrival estimate. For example, the peak is at the $143^{rd}$ sample out of 256. This translates into the arrival time of $$\left(215 + \frac{143-128}{32}\right) \times 50 = 10,773.4375 \; ns.$$

The above formula originates from the following. For example, time is divided into 256 intervals of $\frac{1}{32}$ sample each, 8 samples in total from 212 to 219 inclusive. The high-resolution estimate provides the number of $\frac{1}{32}$ samples from start of the interval, between 0 and 255 inclusive. In the above example with respect to the $143^{rd}$ sample, the time estimate in nanoseconds is the coarse estimate (e.g., 215) plus the fraction $\frac{15}{32}$ $$\left(\text{see above } \frac{143-128}{32}\right)$$

translated into number of samples*50 nsec. By comparison, the coarse estimation in this example yields 215×50=10,750.0000 ns. In the example, the difference between the coarse and fine estimates translates into a displacement of 13.59 meters (58 cm per nanosecond as explained above).

Figure 14:
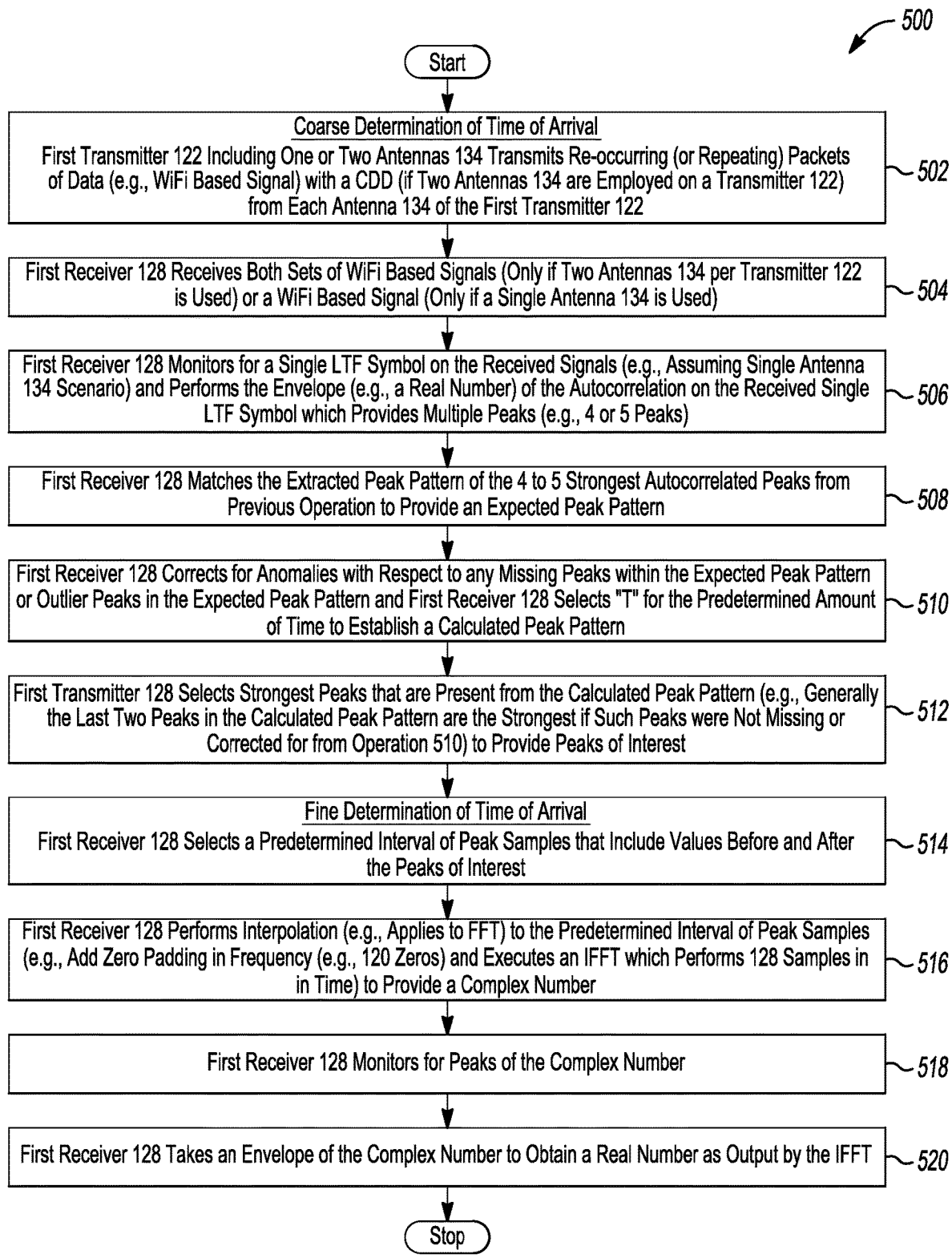
FIG. 14 depicts at least one aspect related to performing a coarse detection and a fine detection method in accordance to one embodiment.

FIG. 14 depicts a method 500 for performing a coarse determination of the time of arrival (e.g., see operations 502-514) and a fine determination of the time of arrival (e.g., see operations 514-520) in accordance to one embodiment of the present invention.

In operation 502, the first transmitter 122 including one or two antennas 135 transmits re-occurring (or repeating) packets of data (e.g., WiFi based signal) with a CDD (if two antennas 135 are employed on a transmitter 122) from each antenna 135 of the first transmitter 122.

In operation 504, the first receiver 128 receives both sets of WiFi based signals (e.g., this is the case if two antennas 135 per transmitter 122 are used). If a single antenna 135 is incorporated on the first transmitter 122, then only a single WiFi based signal is received.

In operation 506, the first receiver 128 monitors for a single LTF symbol on the received signals (e.g., again assuming a single antenna 135 implementation) and performs the envelope (e.g., a real number) of the autocorrelation on the received single LTF symbol which provides multiple peaks (e.g., 4 or 5 peaks). In other words, the first receiver 128 determines the envelope autocorrelation which corresponds to the four strongest peaks of the LTF symbol.

In operation 508, the first receiver 128 matches the extracted peak pattern of the four strongest autocorrelation envelope peaks from previous operation to provide an expected peak pattern or both. Each of the peaks of the expected peak pattern, in absence of noise, may be separated by a predetermined amount of time (e.g., T+0, T+4, T+64, or T+68) for two transmitting antennas 135 of the first transmitter 122. Out of the four strongest autocorrelation peaks, it is possible that one such peak may be erroneous (unrelated to the transmitted signal) and the other may be missing altogether (e.g., excluded from the list of four strongest peaks).

In operation 510, the first receiver 128 corrects for anomalies with respect to any missing peaks within the expected peak pattern or outlier peaks in the expected peak pattern (or both). The first receiver 128 determines the time "T" for the predetermined time interval to establish a calculated peak pattern. Assuming for example, that the first receiver 128 determines that T corresponds to 70, then the calculated peak pattern is (70, 74, 134, 138). This generally corresponds to a noise free peak pattern. However, as noted above, the more likely measured peak pattern may include, for example, an erroneous value (e.g., one peak may be erroneous) and a missing value (e.g., one peak may be missing from the detected LTF symbol). For example, the expected peak pattern may be (70, 90 (an erroneous value), 134, 138). The first receiver 128 may fill in for the missing peak and discard the erroneous peak from the received peak pattern and provide (70, 74, 134, 138) as the reinforced peak pattern (or calculated peak pattern). The first receiver 128 may select the peak T+64=134 as the course peak. Again, the peak 134 is not an erroneous or missing peak, therefore such a peak is suitable for further examination and to perform additional analysis. On the other hand in the above example, T+4=74 was missing (i.e., a phantom) and cannot be used further for locating.

In operation 512, the first receiver 128 selects one or more strongest peaks that are present in the calculated peak pattern to provide one or more peaks of interest. Assuming the expected peak pattern is (70, 74, 134, 138) as noted in operation 510, the first receiver 128 selects the peaks of 134 as the peaks of interest as a result of performing the coarse determination. It bears mentioning that the first receiver 128 only selects the one or more peaks that are initially present as identified in the expected peak pattern. Because peak 134 was present, this peak will be selected. Further, the first receiver 128 is generally interested in the strongest peaks. In general, the peak pattern of 70, 74, 134, 138 may be of equal strength and those received prior to these may be considered weak (e.g., see FIG. 9 and peaks to the left of 394). The peak pattern 70, 74, 134, 138 may be considered to have noise free equal strength as a result of the one half of the LTF, as the LTF is repeated two and one half times. The pattern recognized as described above selects the N strongest peaks, ignoring the fact that weaker peaks arrive sooner. One or more of the strongest peaks generally occur later in time. If both of the strongest peaks are present as illustrated in the example provided, then the first receiver 128 may take the average timing estimates of such values. Again, the first receiver 128 will disregard a peak that is determined to be erroneous or missing as this will lead to an outlying estimation.

The fine estimation of arrival starts in operation 514. In operation 514, the first receiver 128 selects a predetermined interval of peak samples that include values before and after the peak of interest. For the peak of interest (e.g., 134); the first receiver 128 selects the interval of [131-138] for a total of 64 LTF samples (pre autocorrelation) for fine estimation processing.

In operation 516, the first receiver 128 performs interpolation (e.g., applies a Fast Fourier Transform (FFT) based interpolation) to the predetermined interval of peak samples. In this case, the first receiver 128 performs the FFT, zero pads in frequency (e.g., (16−1)*64=960 zeros) e.g., 16 fold interpolation, and performs an Inverse Fast Fourier Transform (IFFT) which results 16*64=1024 complex samples in time. The resultant LTF interpolation of 1024 samples is correlated with a 16 fold interpolated fresh (synthetic) LTF signal, $LTF_{x16}$, 64*16 samples long, to provide a high time resolution of the LTF autocorrelation signal, 50/16=3.125 ns per sample in the example. $LTF_{x16}(16*k)=LTF(k)$, k=0, 1, 2, . . . 63, zero otherwise. In general, the higher the interpolation the better the resolution is with at the added cost of complexity. The resolution may have some physical limitations. In terms of applications, it may be preferable to aim for an interpolation of 32 or even 64 which amounts to 47 cm or 23 cm, respectively. In general, 1 nanosecond amounts to 30 cm.

In operation 520, the first receiver 128 takes the envelope of the complex number as output by the IFFT to obtain real envelop numbers. Such an output provides the two highest peaks (e.g., roughly 134 or 138) since these peaks were the strongest peaks as determined during the coarse determination. In this case, the first receiver 128 is taking the strongest peak out of 128 samples (which is provided by performing the IFFT) and that peak value corresponds to 134.25 (e.g., this is four samples after 134 (e.g., 4/16=0.25). The method 500 provides an accuracy of 1/16 of a sample and this yields an improvement. In general, such an accuracy of 1/16 of a sample amounts to 50/16*0.3 m=0.94 m.

Multipath and Impact on Locationing Systems

Figure 15:
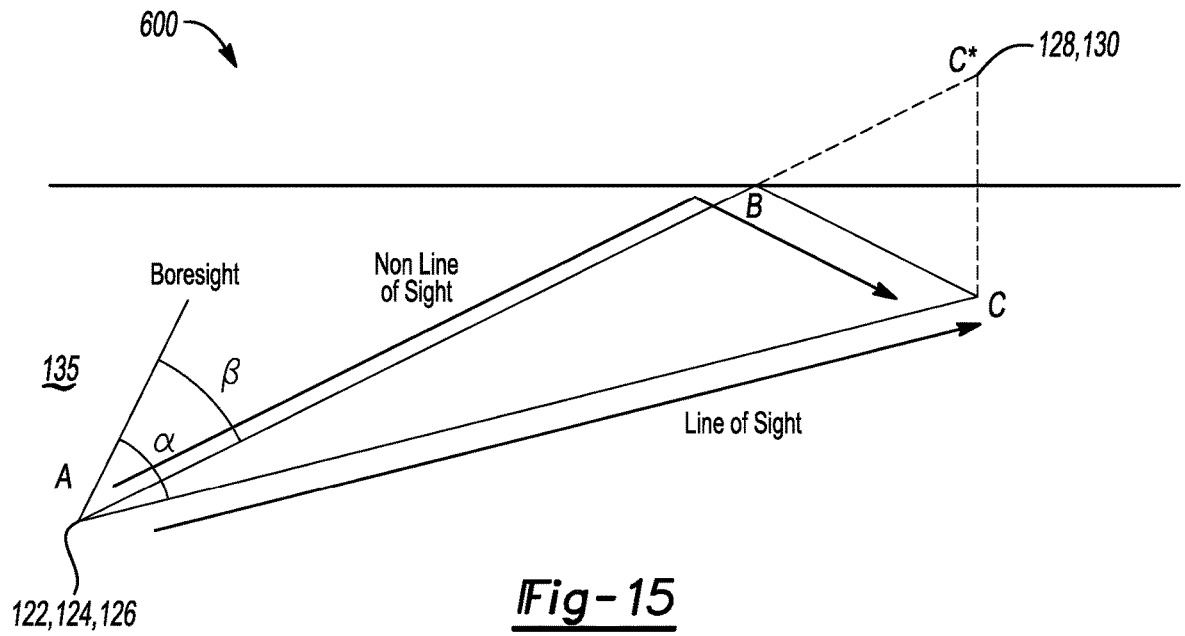
FIG. 15 depicts a wireless system that exhibits a multipath condition.
Figure 16:
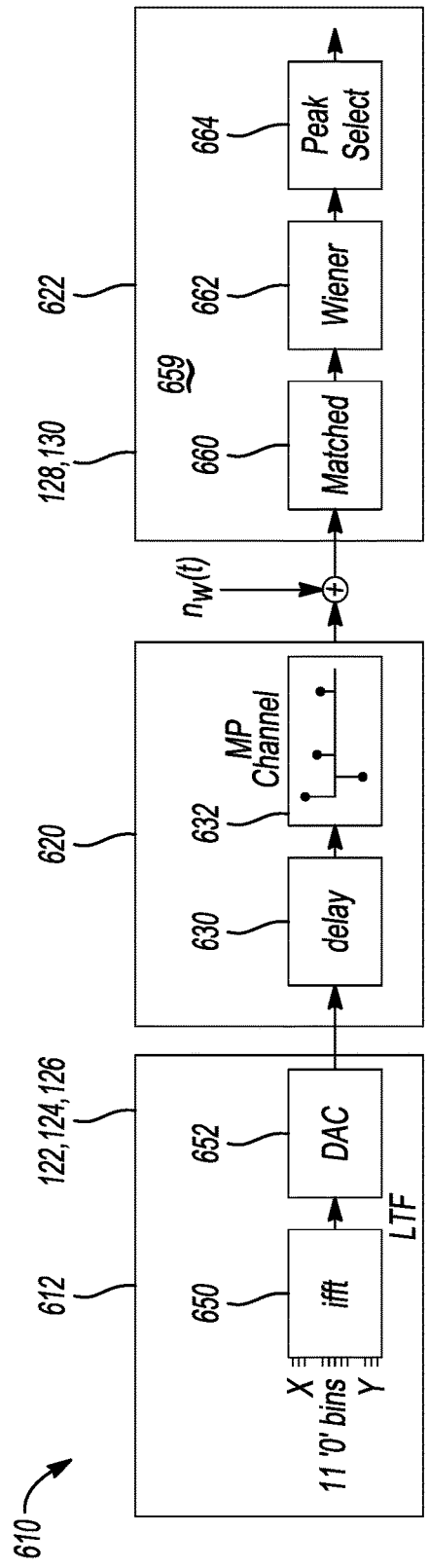
FIG. 16 depicts a system for providing a non-parametric mitigation for a multipath condition based on a ToF locationing implementation in accordance to one embodiment.

FIG. 15 depicts a wireless system 600 that exhibits a multipath condition. For example, the system 600 illustrates the transmitter 122, 124, 126 wirelessly communicating with the receiver 128, 130 for data and telecommunication applications. The receiver 128 or 130 extracts either phase difference between antennas 135 in the transmitter 122, 124, 126 (e.g., see 'A') in Direction Finding (DF) (or Interferometry) or ToA applications. As shown above, DF or ToA provide attributes indicative of the location of the receiver 128, 130. The earlier the time of arrival (ToA), the closer the receiver 128, 130 is to the transmitter 122, 124, 126. Also, the smaller the carrier phase difference between antennas 135 of the transmitter 122, 124, 126; the closer the Direction of Departure (DoD a in FIG. 1 below) is to a Boresight. The antennas 135 (or linear antenna array) of the transmitter 122, 124, 126 may form a colinear constellation of antennas. The Boresight is generally a point in space that is perpendicular to the colinear constellation of antennas. A two element antenna array is by definition colinear. In general, the multipath creates a bias in the estimation as the estimated ToA is positively biased since non-Line of Sight (NLoS) paths are longer than LOS paths as illustrated in FIG. 16. In reference to FIG. 15, the signal transmission in the path from A to C is defined to be the LoS path. The signal transmission in the path from AB+BC is defined to be the non-LoS which is longer than the LoS path. In general, the estimated location is farther than the actual location. Direction is either positively or negatively biased. The bias in this case is sensitive due to the disparity between the Carrier Phase Difference (CPD) at the LoS and the CPD at the transmitter 122, 124, 126 to reflector direction. The bias is greater in magnitude in cases the reflection is stronger in magnitude. The bias is greater at:

$$CPB(\beta) = CPD(\alpha) \pm \frac{\pi}{2}. \qquad \text{(Eq. 14)}$$

Wideband communication systems require channel training mechanisms to cope with channel distortions, which may be typically due to multipath. As noted above, a known training field is transmitted (e.g. LTF in WiFi). The receiver 128, 130 may analyze the effects of the channel by comparing the deformed signal relative to the well-known transmitted signal or the LTF signal. In general, the system 600 may utilize the LTF signal (or training signal) that may be typically designed to provide good autocorrelation properties to estimate (e.g., in the sense of Maximum likelihood) the ToA as the autocorrelation peak (e.g., see corresponding text provided in connection with FIGS. 10 and 13 above). The system 600 exploits the autocorrelation properties of the training signal (or the LFT signal) to separate the superimposed signal originating from the antennas 135 by selecting peaks at a known time difference and then taking a difference of phase between the peaks.

Non-Parametric Mitigation

FIG. 16 depicts a system 610 for providing a non-parametric mitigation for a multipath condition based on the ToF locationing implementation in accordance to one embodiment. The system 610 generally includes a front-end portion 612 of any one or more of the transmitters 122, 124, 126, a transmission medium (or free space constrained by multipath conditions and additive noise) 620, and a multipath mitigation section 622 of any one or more of the receivers 128, 130. The transmission medium 620 generally corresponds to an inherent delay 630 in the wireless signal as being transmitted from the transmitter 122, 124, 126 to the receiver 128, 130 and a multipath channel 632. In general, under the assumption that a propagation model is described by LOS plus reflections from walls, ceilings and floors, the multipath channel may be, for example, a Linear Time Invariant (LTI) system with an impulse response including a linear combination of Kronecker Delta functions. In one example, the model represented by the multipath channel 632 may slowly change, for example, every 100 msec. Generally speaking, the multipath channel 632 may correspond to reflections (not noise) of the wireless signal transmitted from the transmitter 122, 124, 126 to the receiver 128, 130. Such reflections may be positive or negative and are not considered noise.

The front-end portion 612 of the transmitter 122, 124, 16 includes a first transform block 650 and a first converter 652. It is recognized that the transmitter 122, 124, 126 may include any number of microprocessors and memory for executing instructions to perform the functionality provided by the first transform block 650 and the first converter 652. The first transform block 650 may be implemented as an Inverse Fast Fourier Transform (IFFT) block 650. The first converter 652 may be implemented as a digital to analog converter 652. The IFFT block 650 converts frequency input bins from a frequency domain into a time domain. As noted above, the transmitter 122, 124, 126 may transmit WiFi based signals to the receivers 128, 130. The WiFi based signals include training fields (or LTF symbols). The digital to analog converter 652 converts a digital output in the time domain from the IFFT block 650 into an analog output for wireless transmission from the front-end portion 612 of the transmitter 122, 124, 126 to the receiver 128, 130. The transmitted signal from the transmitter 122, 124, 126 undergoes the delay 630 and experiences MP conditions. The multipath channel 632 serves as a characterization for the MP condition (or one or more reflections) as the wireless signal travels over the transmission medium 620.

The receiver 128, 130 includes at least one controller 659, a first filter block 660, a second filter block 662, and a peak select block 664. It is recognized that the receiver 128, 130 includes the at least one controller 659 (or microprocessor) to execute instructions for providing the functions performed by the first filter block 600, the second filter block 662, and the peak select block 664. The first filter block 660 may be implemented as, for example, a matched filter. The second filter block 662 may be implemented as, for example, a Wiener filter. As noted above, the LTF signal serves as a training signal (e.g., WiFi 8 μsec LTF signal) and may be passed to the first filter block 660. The matched filter block 660 may perform the operation 506 as noted above in connection with FIG. 14 to perform autocorrelation on the received LTF signal. For example, the matched filter block 660 may monitor for LTF symbols from the received signals and performs the autocorrelation on the received LTF symbols. In general, the resultant autocorrelation may be deliberately wider than a perfect Sinc function (or sine cardinal). Widening may be achieved by depopulating frequency bins at the extremes of the channel (e.g., bins 27-37) in OFDM WiFi. As a result, the impulse response in frequency may be 64/53 wider. Widening is a direct result of depopulating, for example, the eleven edge frequency bins with five on one side of the spectrum and six on the other side, in the transmitter 122, 124, 126. The transmitter is generally given in this context as part of a standardized protocol. The reason this may be mandated is to avoid spillover to adjacent channels.

The second filter block 662 (or Wiener filter block) calculates a Least Mean Square (LMS) with the autocorrelation function h(t). Autocorrelation is generally defined as a representation of the degree of similarity between a given time series and a lagged version of itself over successive time intervals. For example, the Wiener filter block 662 calculates H(f), where H(f)=F {h(t)}:

$$W(f) \stackrel{def}{=} \frac{H(f)^*}{|H(f)|^2 + SNR^{-1}} \quad \text{(Eq. 15)}$$

Additionally, the Wiener filter block 662 is defined by W(f) as set forth in Equation 15. SNR is the signal to noise ratio. The noise is assumed to be white. The SNR can be estimated in the following manner. The bins on the LTF signal are BPSK modulated (e.g., the bins are either +1 or −1 at the transmitter 122, 124, 126). The square of every bin is always fixed to one, hence by analyzing the square of the bins (e.g., there are 52 bins in this case), the variance is proportionally inflicted by noise and at high enough SNR, the mean is dominated by the signal. The ratio of the mean squared over the variance across the sequence of 52 is considered a well-known good measure of the SNR. The output of the Wiener filter block 662 may correspond to linear transformation of the estimated channel model (or the multipath channel 632).

In general, the Wiener filter block 662 may be utilized as a deblur filter. Signals transmitted by the transmitter 122, 124, 126 may be blurred due to the bandwidth of the transmitted signal being limited and may have a decorrelation time (e.g., 18 meters/c, where c is the speed of light) larger than the multipath delay spread (e.g., typically 2-15 meters/c). Further, the Wiener filter block 662 applies the deblurring to the superposition of two transmitting antennas 135. Since the single sided decorrelation time of the LTF is one fourth the cyclic delay (e.g., the delay shift is four samples) there is little overlap between the individual correlations. In general, the resultant output provided by the Wiener filter block 662 may not be the channel estimation but rather serves as an input to further detection by the peak selection block 664.

The peak selection block 664 selects peaks as disclosed above in operations 506, 508, 510, and 512 as noted in connection with FIG. 14. For example, the transmitter 122, 124, 126 having a plurality of antennas 135 may generate a WiFi-based LTF signal that provides four equi-magnitude autocorrelation peaks in two pairs. The second pair is a 64-sample delayed version of the first pair. The first pair is the autocorrelation of the first 64 sample patterns transmitted by a first antenna 35 that is superimposed by the first 64 sample pattern that is transmitted by a second antenna 35. The second autocorrelation peak (as transmitted by the second antenna 35) precedes the first autocorrelation peak of the exact cyclic delay (the CDD mechanism) (as transmitted by the first antenna 35). Each of the autocorrelated peaks may include four, 50 nsec samples (e.g., −200 nsec). The peak selection block 664 matches the input time series against the four peaks at t+0, t+4, t+64, t+68, where 't' is unknown. Further, the peak select block 664 is configured to be tolerant to noise. The peak select block 664 assumes that one of the above expected peaks is missing (e.g., that peak is not among the four strongest peaks in the input). The peak select block 664 assumes up to one of the four strongest peaks is not genuine (e.g., at an arbitrary position other than the expected positions).

Figure 18:
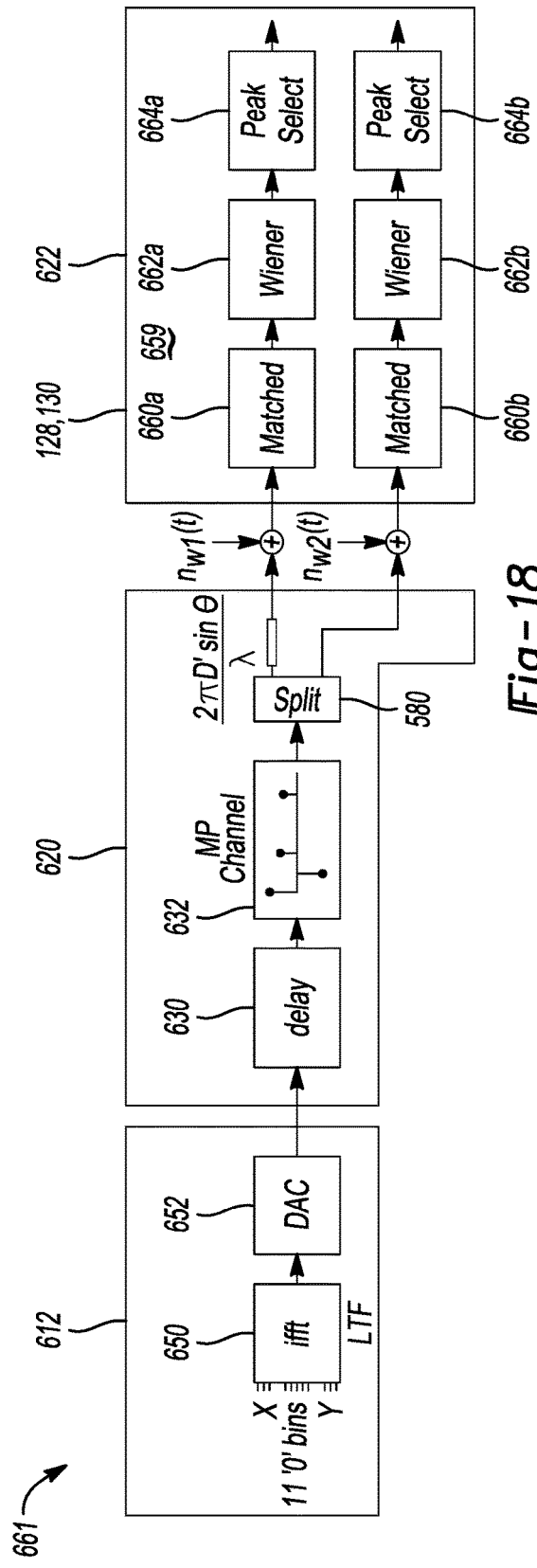
FIG. 18 depicts a system for providing a non-parametric mitigation for a multipath condition based on an Angle of Arrival (AOA) locationing implementation that utilizes a single transmitter in accordance to one embodiment.
Figure 19:
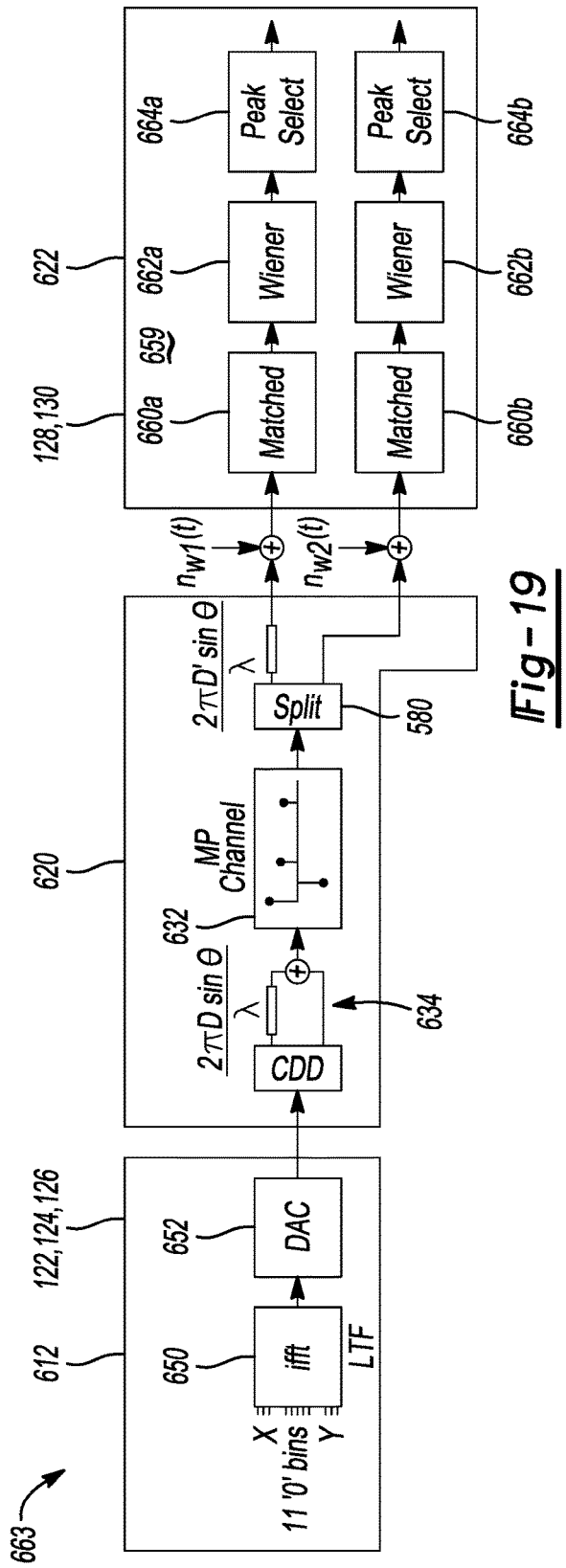
FIG. 19 depicts a system for providing a non-parametric mitigation for a multipath condition based on an Angle of Arrival (AOA) locationing implementation that utilizes dual transmitters in accordance to one embodiment.

Generally, in the case of determining the location based on the Angle of Arrival (AoA), the Wiener filter block 662 may be employed to each receiving input or port individually, for the receiver 128, 130. The peak selection block 664 may then identify which of the 2.5 replica matches each peak. The receiver 128, 130 is replicated to a second antenna port in the case of AoA as depicted in FIGS. 18 and 19 below. The peak selection block 664 processes one or two signals from the one or two transmitting antennas as identified by D' in FIGS. 18 and 19. Referring back to the TOF implementation and assuming a Near Line of Sight (NLoS), (e.g., the line of the sight ray of the signal transmitted by the transmitter 122, 124, and 126 is stronger than reflected rays), the peak detection block 664 utilizes the highest peak as time of arrival, up to a known, fixed delay in the receiver 128, 130.

The Wiener filter block 662 deblurs the received signal which may be blurred by the bandwidth limited transmitted signal. At the output of the matched filter block 660, the reflected ray spills over the LOS ray thereby pushing the peak into the future (creating a positive estimation bias). At the output of Wiener filter block 662, the peaks are steeper, the signal experiencing the multipath condition does not spill over the LOS peak and hence does not push the signal into the future. In general, the peak select block 664 selects the location of the peak along the time axis which serves as the ToA estimation and the signal is far less biased by the multipath condition.

Figure 17:
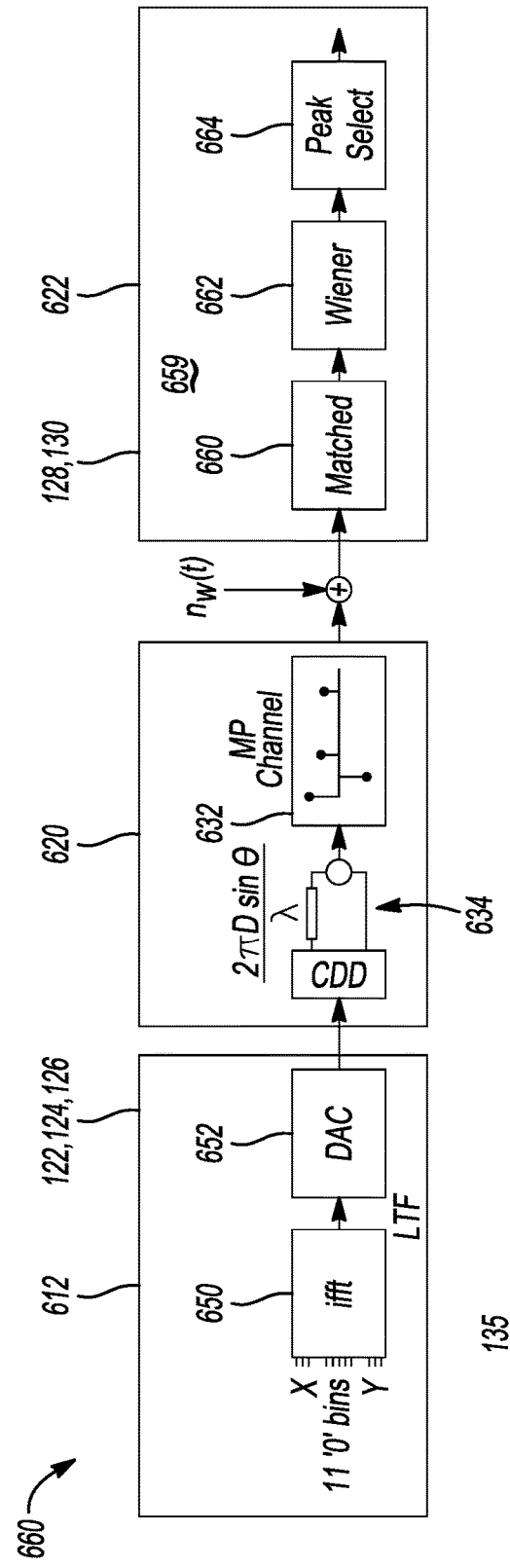
FIG. 17 depicts a system for providing a non-parametric mitigation for a multipath condition based on an interferometric location sensing implementation in accordance to one embodiment.

FIG. 17 depicts a system 660 for providing a non-parametric mitigation for a multipath condition based on an interferometric location sensing implementation in accordance to one embodiment. In general, the front end 612 of the transmitter 122, 124, 126 and the multipath mitigation section 622 of any one or more of the receivers 128, 130 are generally similar to the front end 612 and the multipath mitigation section 622 as set forth in FIG. 16. However, the transmission medium (or free space) 620 may be characterized by a CPD block 634 comprising a block of four samples in the transmitter 122, 124, 126 and interferometry which results in a CPD as opposed to the delay block 630 as set forth in FIG. 16. The CPD block 634 may be characterized by CPD=($2\pi$ D sin $\theta/\lambda$). The interferometry formalized in the foregoing equation may generally define the multipath channel 632. The interferometry formalized in the following equation: CPD=($2\pi$ D sin $\theta/\lambda$) generally defines the transmission medium 620. In the absence of multipath, a phase difference between peaks, four samples apart with respect to the CPD may be a direct result of the channel response. U.S. Pat. No. 10,182,315 ("the '315 patent) and U.S. Pat. No. 9,814,051 ("the 051 patent) both entitled "Identifying angle of departure of multi-antenna transmitters" which are hereby incorporated by reference in their entirety may be used to provide an estimate for the channel with the CPD equation noted above. The multipath channel 632 corresponds to reflections (not noise) of the wireless signal transmitted from the transmitter 122, 124, 126 to the receiver 128, 130. Such reflections may be positive or negative and are not considered noise.

In the CDD-DF case, the phase at each of the transmitting antennas 135 peaks at the output of the matched filter block 660 which is biased by multipath condition thereby resulting in a bias of at least one CPD estimator. Generally, there may be two estimators (e.g., one in the time domain and another in a frequency domain) and such estimators may provide an estimate of the AOD as set forth in the '051 patent and the '315 patent. These estimates are not aware of the Wiener filter block 662. The Wiener filter block 662 may reduce a bias of the estimators at the expense of added variance. Given the relative amplitude of the reflection, the bias is higher when the CPD in the direction of the particular reflection is perpendicular to the CPD in the LOS direction, all viewed as Departure angles, from the transmitting antennas 135 of the transmitter 122, 124, 126. At the output of the Wiener filter block 662, the inherently paired peaks (even without multipath) may be deblurred into multiple peak-pairs (e.g., by the Wiener filter block 662), one pair (e.g., one per transmitting element) per path in the multipath channel 632. The peak selection block 664 may ensure that the LOS peak pair is selected, from which peaks, the CPDs are computed as noted above. The Wiener filter block 662 reduces the bias in CPD estimation. The Wiener filter block 662 is linear, and hence deblurs the superposition (of the rays transmitted from the antennas 135 of the transmitter 122, 124, 126) at the receiver port and is equivalent to a superposition of deblurred signals from each antenna 135 of the plurality of antennas 135 positioned on the transmitter 122, 124, 126. The individual LOS peak phases are less biased. Hence, in the worst case, so is the CPD as set forth in the '051 patent.

The Wiener filter block 662 may be utilized in varying channel conditions (e.g., wireless communications indoors and in urban areas). For example, the Wiener filter block 662 may be utilized in delay spread scenarios whereby a time difference between LOS and reflection paths is smaller than the decorrelation time of the training signal (e.g., LTF signal, 64/53*20 nsec) which is equivalent to, for example, 18 meters while taking into account the speed of light.

FIG. 18 depicts a system 661 for providing a non-parametric mitigation for a multipath condition based on an Angle of Arrival (AoA) location sensing implementation with a single transmitter (or single antenna 135 implementation) in accordance to one embodiment. One example of determining locationing information utilizing AoA is set forth in "Angle of Arrival Estimation using WiFi and Smartphones", SCHUSSEL, Martin, 4-7 Oct. 2016 as the 2016 International Conference on Indoor Positioning and Indoor Navigation (IPIN), Alcala de Henares, Spain which is incorporated by reference in its entirety. The system 661 includes the transmitters 122, 124, 126, the transmission medium 620, and the receivers 622. Generally, the system 661 illustrates an embodiment that may be utilize multiple first filter blocks 660a-660b, multiple second filter blocks 662a-662b, and multiple peak select blocks 664a-664b. In general, with the AoA implementations, the receiver 128, 130 receives two signals from the transmitters 122, 124, 126. The operations performed by each of the first filter block 660, the second filter block 662, and the peak select blocks 664 as noted above may be similarly performed for each of the first filter blocks 660a-660b, the second filter blocks 662a-662b, and the multiple peak select blocks 664-664b, respectively. It bears mentioning that a splitter 580 as illustrated in the transmission medium 620 simply represents that copies from the transmitter 122, 124, 126 propagate to an input of the receiver blocks 660a, 660b.

FIG. 19 depicts a system 663 for providing a non-parametric mitigation for a multipath condition based on an Angle of Arrival (AoA) location sensing implementation with a dual transmitter (or antenna 135 implementation) in accordance to one embodiment. The system 663 includes the transmitters 122, 124, 126, the transmission medium 620, and the receivers 622. Generally, the system 661 illustrates an embodiment that may be utilized with multiple first filter blocks 660a-660b, multiple second filter blocks 662a-662b, and multiple peak select blocks 664a-664b. In general, with the AoA implementations, the receiver 128, 130 receives two signals from the transmitters 122, 124, 126. The operations performed by each of the first filter block 660, the second filter block 662, and the peak select blocks 664 as noted above may be similarly performed for each of the first filter blocks 660a-660b, the second filter blocks 662a-662b, and the multiple peak select blocks 664-664b, respectively.

Post Mitigation Peak Selection

The peak select block 664 as illustrated in connection with FIGS. 16-20, employs a decision algorithm based on a complex scalar time series input. The corresponding text as disclosed above in connection with FIGS. 10-13 generally corresponds to operations that may be performed by the peak select block 664. In one example, the peak select block 664 may employ a Maximum Likelihood pulse position estimation which returns the index of the element, the absolute value of which is the highest. This peak select block 664 may be used to estimate the time of arrival of a signal from the transmitter 122, 124, 126, the autocorrelation of which is steep (e.g., the signal falls from a maximum to almost zero within a small amount of time, typically (+/−) 50 ns*64/53/2).

The LTF signal comprises 2.5 repetitions of a basic 64 sample pattern, totaling 64*2.5=160 samples. The autocorrelation of this signal comprises two steep peaks, that may be 64 samples apart (see FIG. 13). The peak select block 664 for the time of arrival generally monitors for two major peaks that are approximately 64 samples apart.

The transmitter 122, 124, 126 having a plurality of antennas 135 may generate a WiFi-based LTF signal that provides four major equi-magnitude autocorrelation peaks in two pairs. The second pair is 64 samples delayed version of the first pair. The first pair is the autocorrelation of the first 64 sample pattern transmitted by a first antenna 35 that is superimposed by the first 64 sample pattern that is transmitted by a second antenna 35. The second autocorrelation peak (as transmitted by the second antenna 35) precedes the first autocorrelation peak of the exact cyclic delay (the CDD mechanism) (as transmitted by the first antenna 35). Each of the autocorrelated peaks may include four, 50 nsec samples (e.g., ~200 nsec). The peak selection implementation as described above matches the input time series against the four peaks at t+0, t+4, t+64, t+68, where 't' is unknown. Further, the peak select block 664 is configured to be tolerant to noise. The peak select block 664 assumes that one of the above expected peaks is missing (e.g., that peak is not among the four strongest peaks in the input). The peak select block 664 assumes up to one of the four strongest peaks is not genuine (e.g., at an arbitrary position other than the expected positions).

In general, the Wiener filter block 662 has no knowledge of peak patterns. Rather, the Wiener filter block 662 sharpens individual peaks and decomposes such peaks into individual peaks. The sharpened peaks may better fit the expected peak pattern, and in the DF case, their phase (not just their envelope) shall be closer to the original phase, thereby improving the DF estimate by reducing the estimator bias.

Method for Non-Parametric Mitigation

FIG. 18 depicts a method 670 for providing the non-parametric mitigation for the multipath condition for the systems 610, 660, 661, 663 of FIGS. 16-20, respectively, in accordance to one embodiment.

In operation 672, the receiver 128, 130 receives a wireless signal from the transmitter 122, 124, 126. A portion of the received wireless signal is generally defined as a narrowband wireless signal and may be transmitted by the transmitter 122, 124, 126 at 5 GHz or 2.4 GHz. As noted above, the wireless signal may include a predetermined symbol (e.g., LTF symbol). The receiver 128, 130 receives the wireless signal over the multipath channel 620 (or wideband transmission channel). The propagation channel 620 exhibits both a multipath condition and additive noise (or multipath condition combined with additive noise). Thermal energy at a front amplifier of the receiver 128, 130 may comprise or form the additive noise which degrades the quality of the wireless signal as such a signal travels from the transmitter 122, 124, 126 to the receiver 128, 130. The first narrowband wireless signal may be combined or convoluted with the wideband channel to form the wireless signal as received at the receiver 128, 130.

In operation 674, the matched filter 660 performs autocorrelation on the received wireless signal to extract the predetermined symbol (or LTF symbol). For example, the matched filter 660 the first receiver 128 monitors for a single LTF symbol on the received signals (e.g., again assuming a single antenna 135 implementation) and calculates the envelope (e.g., a real number) of the autocorrelation on the received single LTF symbol which provides multiple peaks (e.g., 4 peaks). In other words, the first receiver 128 calculates the envelope autocorrelation which corresponds to the four strongest peaks of the LTF symbol. It is recognized that the matched filter 660 may also monitor for an LTF signal from each signal transmitted from any number of the antennas 135 on the transmitter 122, 124, 126.

In operation 676, the Wiener filter block 662 filters the extracted predetermined symbol to deconvolve the received signal to minimize the effects of the multipath condition in the presence of additive noise to provide a deconvoluted signal. As noted above, the Wiener filter block 662 may be utilized as a deblur filter. Signals transmitted by the transmitter 122, 124, 126 may be blurred due to the bandwidth of the transmitted signal being limited and may have a decorrelation time (e.g., 18 meters/c, where c is the speed of light) larger than the multipath delay spread (e.g., typically 2-15 meters/c). The Wiener filter block 662 deblurs the narrowband received signal and this operation serves to minimize the effects of the multipath condition in the presence of additive noise. For example, the Wiener filter block 662 has no knowledge of peak patterns of the LTF symbol. Rather, the Wiener filter block 662 sharpens the individual peaks and decomposes such peaks into individual peaks for further processing by the peak select block 664. In one example, the Wiener filter block 662 provides an estimate of the originally transmitted signal from the transmitters 122, 124, 126, by employing linear time-invariant (LTI) filtering on the deconvoluted signal to provide an estimate of the desired signals transmitted by the transmitters 122, 124, 126. The Wiener filter block 662 (or linear filter) minimizes the mean square error between an estimated random signal and a desired signal. This operation may result in the deconvolution operation as noted above.

In operation 678, the peak select block 664 applies (or performs) peak selection to the output (e.g., first deconvoluted signal) of the Wiener filter block 662. The peak selection block 664 selects peaks as disclosed above in operations 506, 508, 510, and 512 as noted in connection with FIG. 14. The peak selection block 664 matches the input time series against the four peaks at t+0, t+4, t+64, t+68, where 't' is unknown. Further, the peak select block 664 is configured to be tolerant to noise. The peak select block 664 assumes that one of the above expected peaks is missing (e.g., that peak is not among the four strongest peaks in the input). The peak select block 664 assumes up to one of the four strongest peaks is not genuine (e.g., at an arbitrary position other than the expected positions). In this case, the peak select block 664 provides an estimation of T. The receiver 128, 130 may then perform locationing estimation that is not constrained by multipath and additive noise conditions for both ToF and interferometry applications as set forth herein.

Parametric Mitigation

With reference to FIG. 21, a system 710 for providing a parametric mitigation for a multipath condition based on the ToF locationing implementation in accordance to one embodiment is disclosed. Similarly, with reference to FIG. 22, a system 720 for providing a parametric mitigation for a multipath condition based on the interferometric location sensing implementation in accordance to one embodiment is disclosed. Each of the systems 710, 720 includes a parametric block 668 positioned downstream of the peak select block 664 in the receiver 128, 130. In one example, the parametric block 668 may be implemented as a Least Mean Square (LMS) block. It is recognized that the receiver 128, 130 includes the at least one controller 659 (or at least one microprocessor) to execute instructions for providing the functions performed by the first filter block 600, the peak select block 664, and the parametric block 668.

Figure 23:
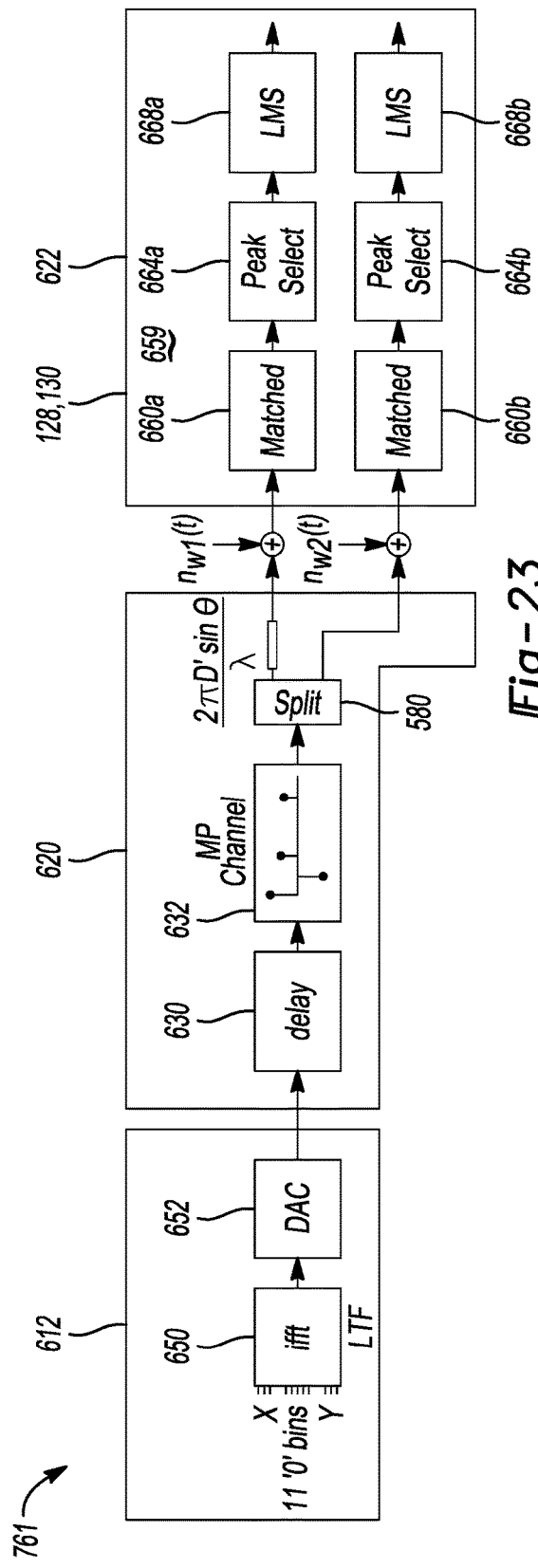
FIG. 23 depicts a system for providing a non-parametric mitigation for a multipath condition based on an Angle of Arrival (AOA) locationing implementation that utilizes a single transmitter in accordance to one embodiment.
Figure 24:
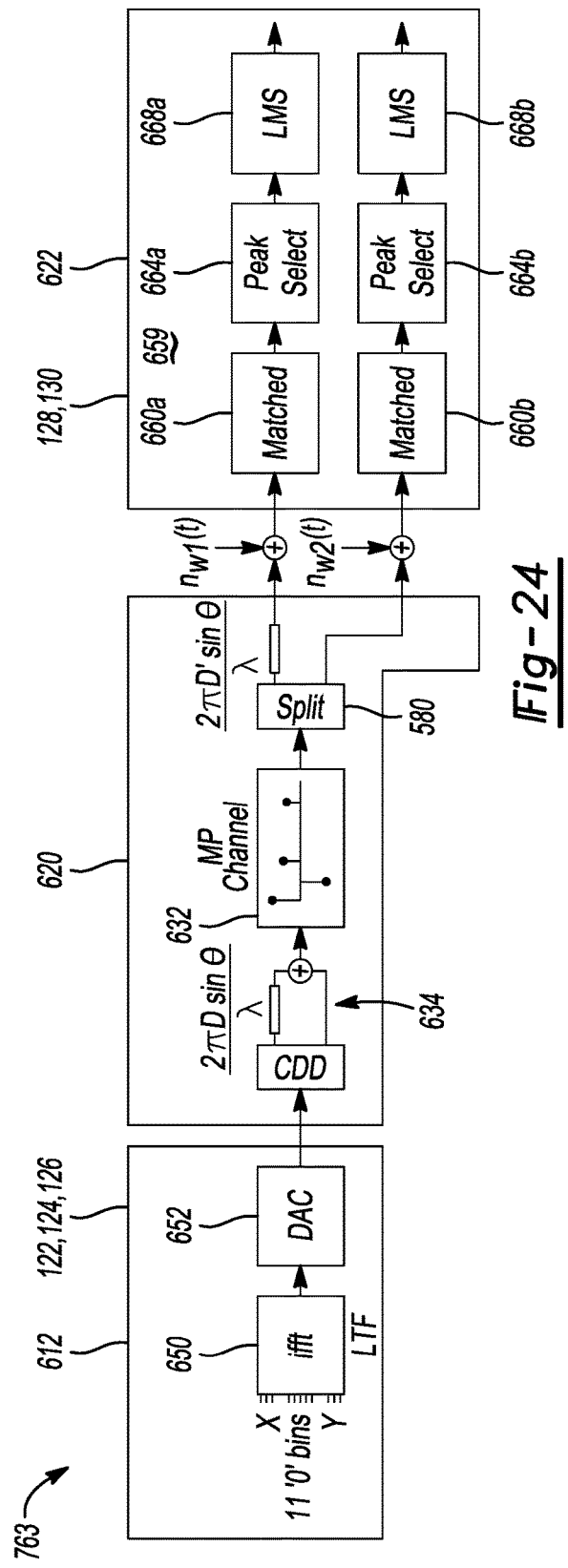
FIG. 24 depicts a system for providing a non-parametric mitigation for a multipath condition based on an Angle of Arrival (AOA) locationing implementation that utilizes dual transmitters in accordance to one embodiment.

In addition, with reference to FIG. 23, a system 761 for providing a parametric mitigation for a multipath condition based on an AoA locationing implementation that utilizes a single transmitter is shown. Further, with reference to FIG. 24, a system 761 for providing a parametric mitigation for a multipath condition based on an AoA locationing implementation that utilizes a single transmitter is shown. The transmitter 122, 124, 126 as illustrated in connection with FIGS. 23-24 include features similarly described above. The receiver 128, 130 in this case includes the multiple first filter block 660a-660b, the multiple peak select blocks 664a-664b, and multiple parametric blocks 668a-668b. The operations performed by each of the first filter block 660, the peak select block 664, and the parametric blocks 668 as noted above may be similarly performed for each of the first filter blocks 660a-660b, the peak select blocks 664a-664b, and the parametric blocks 664-664b, respectively.

In general, the multipath channel 632 may include two propagating signals (e.g. one LOS signal and one non-LOS signal) where one of such propagating signals exhibits a LOS path and the other exhibits one dominant reflection with a small delay spread (e.g. one LOS signal and one non-LOS signal). The parametric block 668 may execute instructions to perform a LMS algorithm to minimize an error relative to the nominal autocorrelation signal. In general, the measured autocorrelation in this case may be somewhat deformed. The LMS algorithm, when executed, may search for example, five scalar values of the physical system in the given above two ray model that may best fit the measured autocorrelation waveform. For example, the parametric block 668 may perform curve fitting to fit a series of data points or autocorrelation peaks as exhibited in FIG. 13. The parametric block 668 provides a parametric description of a dual path channel as characterized by the following equation:

$$y(t)=|a\ \text{sinc}(t-e)+C\ \text{sinc}(t-d)|^2 \quad \text{(EQ. 16)}$$

EQ. 16 as set forth directly above provides the noted curve fitting function. In total, the parametric block 668 takes into account five unknown parameters of physical substance: (1) C which is generally defined as the amplitude of the single non-LOS signal in the multipath channel 630, (2) 'Arg(C)' which corresponds to the relative phase of the single non-LOS signal in the multipath channel 630, (3) 'e' which corresponds to an epoch of the peak of the LOS peak (4) 'd' the epoch of single non-LOS M 'd' and (5) the amplitude of the LOS 'a'. Experimentation has shown this nonlinear cost function behaves well with the LMS approach (e.g. using a sinc( ) autocorrelation). The cost function is nonlinear since the partial derivatives of the cost function with respect to the two unknown peak epochs and relative phase are not constant. The parametric block 668 may compute the following:

$$\hat{x}(t)=y(t)-\hat{C}\ \text{sinc}(t-\hat{d}) \quad \text{(EQ. 17)}$$

where $\hat{x}(t)$ corresponds to an estimator of x(t). Generally, it is desirable to minimize $\hat{x}(t)$ so that the estimated function fits y(t) to estimate the multipath signal (or to estimate the multipath condition or multipath channel 632).

Pre-Mitigation Peak Selection

The operations of the peak select block 664 as described above may apply to individual peaks as illustrated, for example, in FIG. 13. In this case, the peak select block 664 may be preceded by a determination of the position of specific nominal autocorrelation peaks. The parametric block 664 takes the positions of the specific autocorrelation peaks prior to the LMS operation, whereby the estimated "e" (e.g., the peak of the epoch for the non-LOS signal) is determined and then later used in connection with EQ. 16 above when the LMS operation is performed. From a practical perspective, the peak selection block 664 applies the peak selection that fits a predetermined peak pattern (e.g., 0, 4, 64, and 68) and applies the LMS on, for example, four samples around 64 and then applies the LMS again at around 68.

Method for Parametric Mitigation

Figure 20:
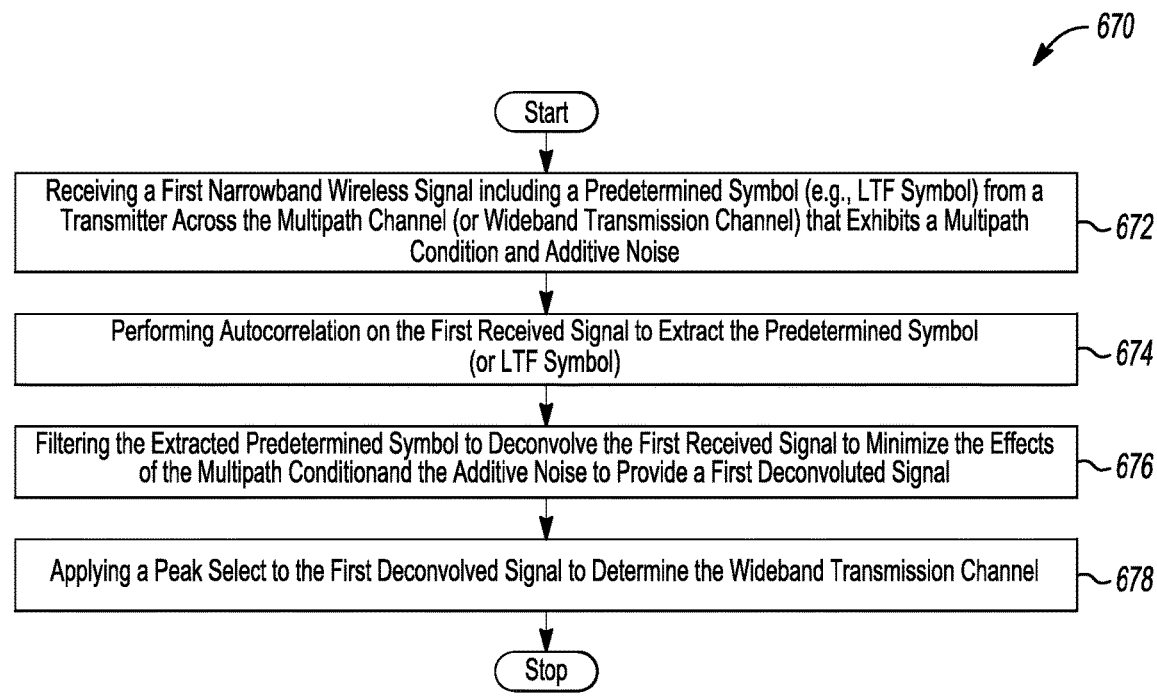
FIG. 20 depicts a method for providing the non-parametric mitigation for the multipath condition for the systems of FIGS. 16-19 in accordance to one embodiment.
Figure 25:
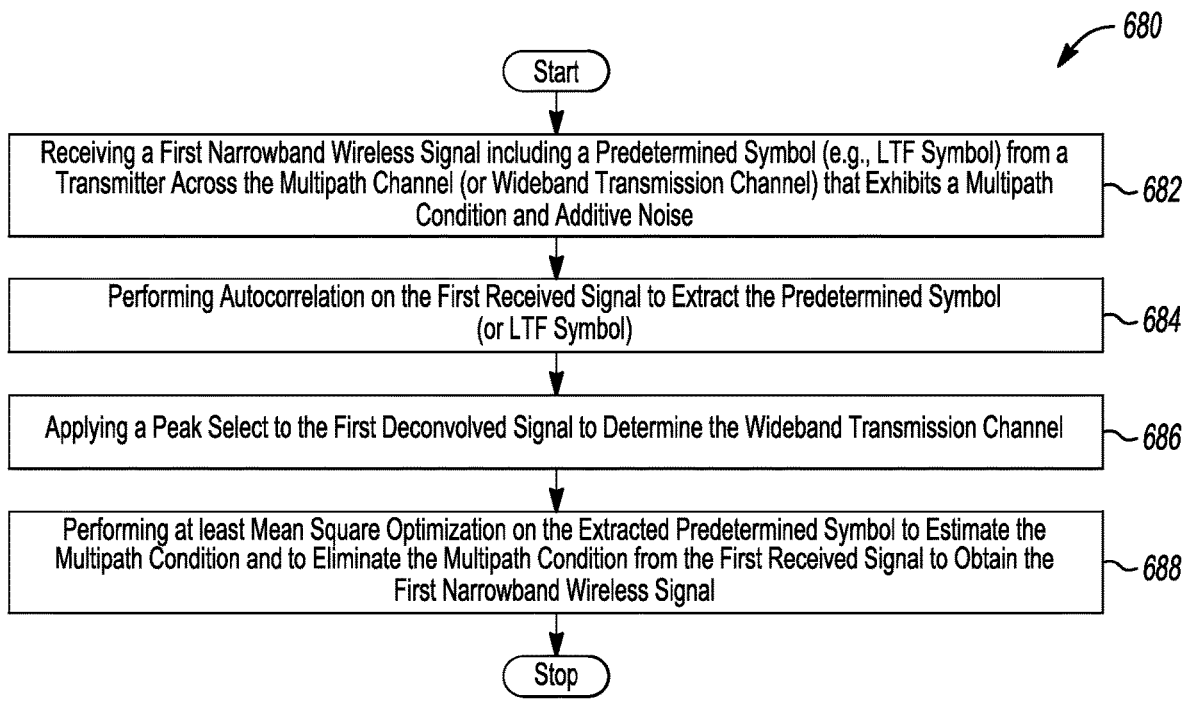
FIG. 25 depicts a method for providing the parametric mitigation for the multipath condition for the systems of FIGS. 21 and 24 in accordance to one embodiment.

FIG. 25 depicts a method 680 for providing the parametric mitigation for the multipath condition for the systems 710, 720 of FIGS. 19 and 20 in accordance to one embodiment.

In operation 682, the receiver 128, 130 receives a wireless signal from the transmitter 122, 124, 126. A portion of the received wireless signal is generally defined as a narrowband wireless signal and may be transmitted by the transmitter 122, 124, 126 at 5 GHz or 2.4 GHz. As noted above, the wireless signal may include a predetermined symbol (e.g., LTF symbol). The receiver 128, 130 receives the wireless signal over the multipath channel 620 (or wideband transmission channel). The multipath channel 620 exhibits both a multipath condition and an additive noise. Thermal energy at the front amplifier of the receiver 128, 130 may comprise or form the additive noise which degrades the quality of the wireless signal as such a signal travels from the transmitter 122, 124, 126 to the receiver 128, 130. The first narrowband wireless signal may be combined or convoluted with the wideband channel to form the wireless signal as received at the receiver 128, 130.

In operation 684, the matched filter 660 performs autocorrelation on the received wireless signal to extract the predetermined symbol (or LTF symbol). For example, the matched filter 660 the first receiver 128 monitors for a single LTF symbol on the received signals (e.g., again assuming a single antenna 135 implementation) and calculates the envelope (e.g., a real number) of the autocorrelation on the received single LTF symbol which provides multiple peaks (e.g., 4 peaks). In other words, the first receiver 128 calculates the envelope autocorrelation which corresponds to the four strongest peaks of the LTF symbol. It is recognized that the matched filter 660 may also monitor for an LTF signal from each signal transmitted from any number of the antennas 135 on the transmitter 122, 124, 126.

In operation 686, the peak select block 664 applies (or performs) peak selection to the received wireless signal. The peak selection block 664 selects peaks as disclosed above in operations 506, 508, 510, and 512 as noted in connection with FIG. 14. The peak selection block 664 matches the input time series against the four peaks at t+0, t+4, t+64, t+68, where 't' is unknown. Further, the peak select block 664 is configured to be tolerant to noise. The peak select block 664 assumes that one of the above expected peaks is missing (e.g., that peak is not among the four strongest peaks in the input). The peak select block 664 assumes up to one of the four strongest peaks is not genuine (e.g., at an arbitrary position other than the expected positions). In this case, the peak select block 664 provides the multipath channel 630 (or the wideband transmission channel) that is free of the multipath condition and the additive noise.

In operation 688, the parametric block 668 performs a least mean square (LMS) optimization on the extracted predetermined symbol to estimate the multipath condition and to eliminate the multipath condition from the first received signal to obtain the narrowband wireless signal. In this operation 688, the parametric block 668 determines the multipath condition that is present (or that the wireless signal as transmitted from the transmitter 122, 124 undergoes while in transmission) and removes the attenuated and delayed multipath copy so that the narrowband signal as transmitted from the transmitter 122, 124 is recovered. In other words, the receiver 128, 130 determines the multipath condition and subtracts the attenuated and delayed copy from the received signal to reconstruct the narrowband signal that is originally transmitted by the transmitter 122, 124. The receiver 128, 130 may then perform the locationing estimation of the transmitter 122, 124 with the narrowband signal under mitigated multipath condition.

As noted above, the LMS algorithm, when executed by the parametric block 668, may search for, for example, five scalar values as given above (see Eq. 16) a two-ray physical model that may best fit the measured autocorrelation waveform. For example, the parametric block 668 may perform curve fitting to fit a series of data points or autocorrelation peaks as exhibited in FIG. 13. The parametric block 668 provides a parametric description of a dual path channel (shortest path plus a single reflection) as characterized by Eq. 17. The receiver 128, 130 may then perform locationing estimation that is far less constrained by multipath and additive noise conditions for both ToF and interferometry applications as set forth herein.

Hybrid Approach

Figure 26:
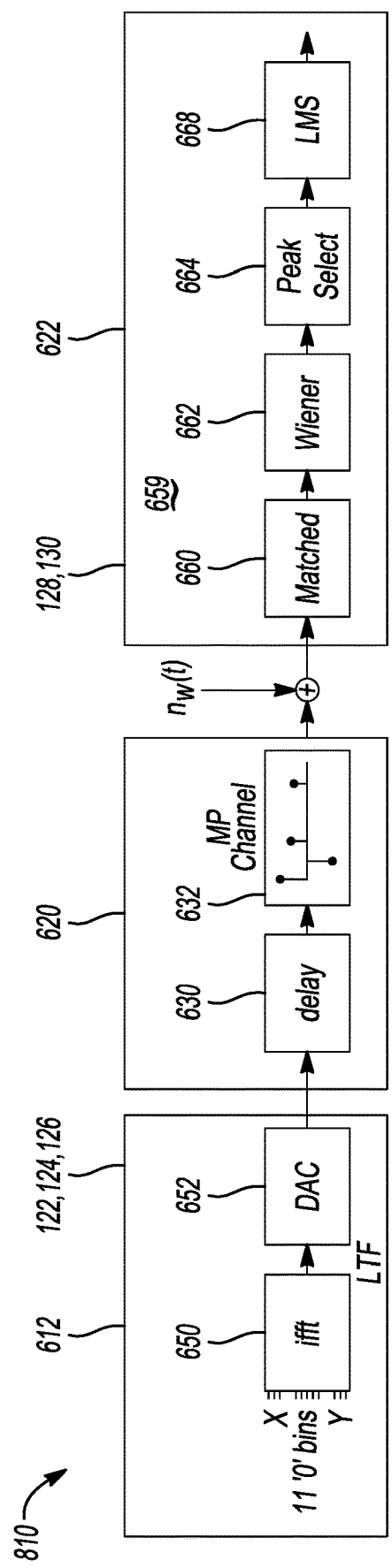
FIG. 26 depicts a system for providing a parametric mitigation for a multipath condition based on the ToF locationing implementation incorporating a hybrid approach in accordance to one embodiment.

With reference to FIG. 26, a system 810 for providing a mitigation for a multipath condition based on the ToF locationing implementation incorporating a hybrid approach in accordance to one embodiment is disclosed. Similarly, with reference to FIG. 27, a system 820 for providing a parametric mitigation for a multipath condition based on the interferometric location sensing implementation incorporating a hybrid approach in accordance to one embodiment is disclosed. For the systems 810, 820; it is shown that the receiver 128, 130 includes both the Wiener filter block 662 as disclosed in connection with the non-parametric implementations of the systems 610, 620 and the parametric block 668 of the systems 710, 720. It is wholly contemplated that the hybrid approach may be employed for the mitigation of multipath conditions for AoA locationing implementations that utilizes a single or dual transmitter as disclosed above in connection with the FIGS. 18-19 and 23-24. In these instances, it is contemplated that the hybrid approach may include the multiple first filter blocks 660a-660b, the multiple second filter blocks 662a-662b, the multiple peak select blocks 664a-664b, and the multiple parametric blocks 668a-668b for the various AoA implementations but arranged in the order as set forth in the receiver 128, 130 as disclosed in connection with FIG. 26 or 27.

The non-parametric solution that incorporates the Wiener filter block 662 is generally optimal as a linear filter regardless of the multipath model as characterized by the multipath channel 630. It is recognized that a system may be employed for both ToF and interferometric implementations, respectively, that can incorporate the advantages gained by the Wiener filter block 662 and the parametric block 668 to account for any number of multipath scenarios that may develop during the transmission of wireless signals from a transmitter 122, 124, 126 to a receiver 128, 130. It is further recognized that any one or more of the systems 610, 660, 710, 720, 810 and 820 may be applied to receivers that utilize interferometric and ToF implementations, mobile devices that utilize Angle of Departure (AoD) and/or Angle of Arrival (AoA), and infrastructure related transmitters (e.g., passive transponders positioned in an infrastructure and access points). It is further recognized that the ToF implementations with respect to systems 610, 710, and 810 may be implemented in mobile devices (e.g., that include receivers) and infrastructure related devices (e.g., access points) for ToF applications.

Method for Hybrid Approach

Figure 28:
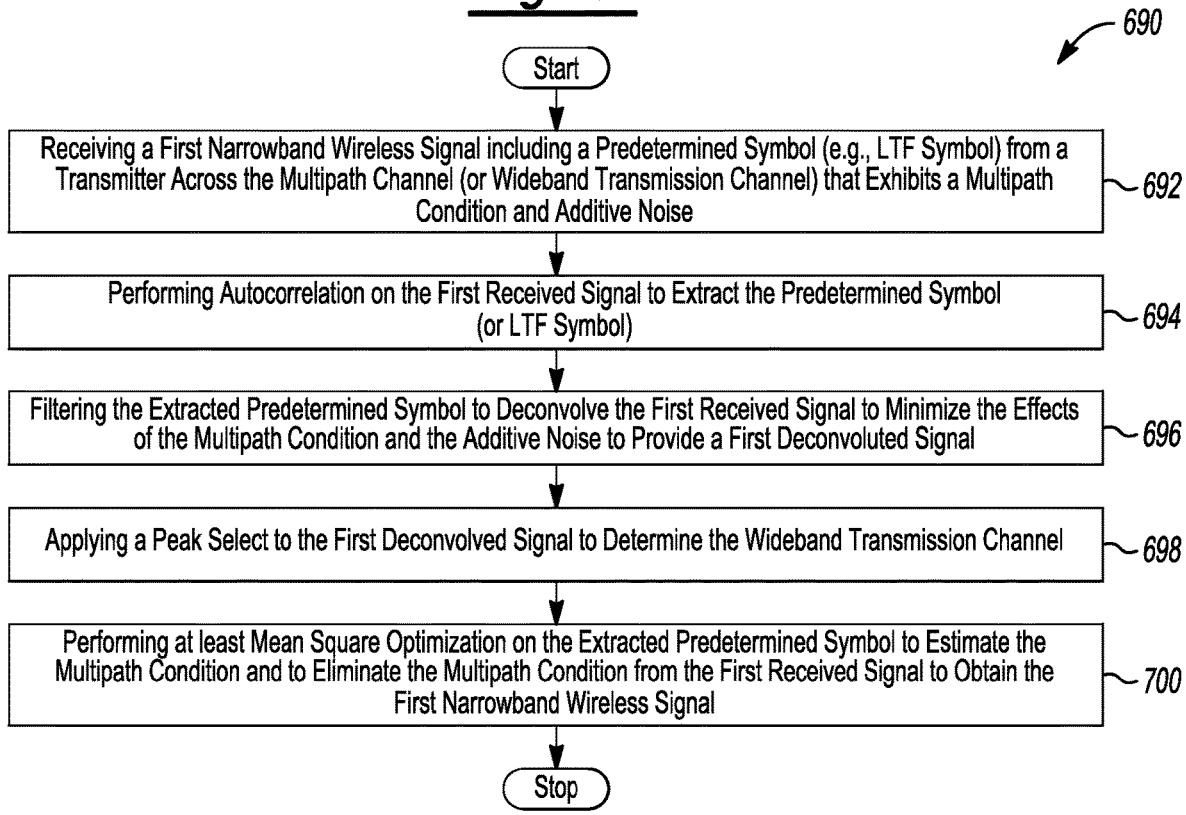
FIG. 28 depicts a method for providing the parametric mitigation for the multipath condition for the systems of FIGS. 26 and 27 in accordance to one embodiment.
Figure 27:
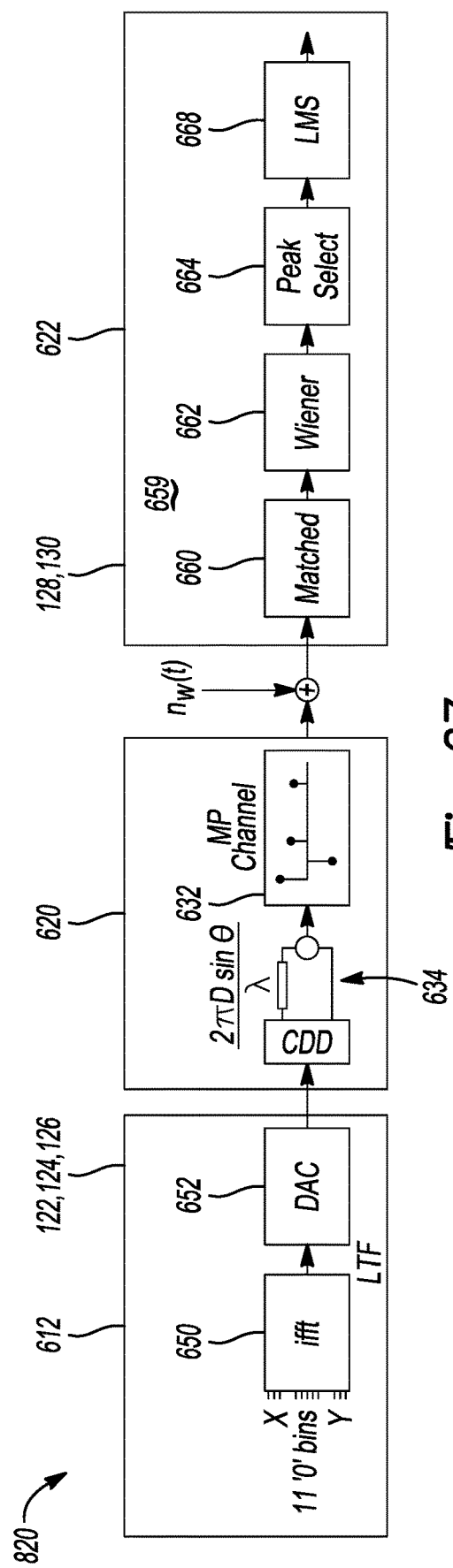
FIG. 27 depicts a system for providing a parametric mitigation for a multipath condition based on the interferometric location sensing implementation incorporating a hybrid approach in accordance to one embodiment.

FIG. 28 depicts a method 690 for providing a mitigation for the multipath condition with the hybrid approach for the systems of FIGS. 26 and 27 in accordance to one embodiment.

In operation 692, the receiver 128, 130 receives a wireless signal from the transmitter 122, 124, 126. A portion of the received wireless signal is generally defined as a narrowband wireless signal and may be transmitted by the transmitter 122, 124, 126 at 5 GHz or 2.4 GHz. As noted above, the wireless signal may include a predetermined symbol (e.g., LTF symbol). The receiver 128, 130 receives the wireless signal over the multipath channel 620 (or wideband transmission channel). The multipath channel 620 exhibits both a multipath condition in addition to an additive noise. Thermal energy at the front amplifier of the receiver 128, 130 may comprise or form the additive noise condition which degrades the quality of the wireless signal as such a signal travels from the transmitter 122, 124, 126 to the receiver 128, 130. The first narrowband wireless signal may be combined or convoluted with the wideband channel to form the wireless signal as received at the receiver 128, 130.

In operation 694, the matched filter 660 performs autocorrelation on the received wireless signal to extract the predetermined symbol (or LTF symbol). For example, the matched filter 660 the first receiver 128 monitors for a single LTF symbol on the received signals (e.g., again assuming a single antenna 135 implementation) and calculates the envelope (e.g., a real number) of the autocorrelation on the received single LTF symbol which provides multiple peaks (e.g., 4 peaks). In other words, the first receiver 128 calculates the envelope autocorrelation which corresponds to the four strongest peaks of the LTF symbol. It is recognized that the matched filter 660 may also monitor for an LTF signal from each signal transmitted from any number of the antennas 135 on the transmitter 122, 124, 126.

In operation 696, the Wiener filter block 662 filters the extracted predetermined symbol to deconvolve the received signal to minimize the effects of the multipath condition and the additive noise to provide a deconvoluted signal. As noted above, the Wiener filter block 662 may be utilized as a deblur filter. Signals transmitted by the transmitter 122, 124, 126 may be blurred due to the bandwidth of the transmitted signal being limited and may have a decorrelation time (e.g., 18 meters/c, where c is the speed of light) larger than the multipath delay spread (e.g., typically 2-15 meters/c). The Wiener filter block 662 deblurs the narrowband received signal and this operation serves to minimize the effects of the multipath condition and the additive noise. For example, the Wiener filter block 662 has no knowledge of peak patterns of the LTF symbol. Rather, the Wiener filter block 662 sharpens the individual peaks and decomposes such peaks into individual peaks for further processing by the peak select block 664. In one example, the Wiener filter block 662 provides an estimate of the originally transmitted signal from the transmitters 122, 124, 126, by employing linear time-invariant (LTI) filtering on the deconvoluted signal to provide an estimate of the desired signals transmitted by the transmitters 122, 124, 126. The Wiener filter block 662 minimizes the mean square error between an estimated random signal and a desired signal. This operation may result in the deconvolution operation as noted above.

In operation 698, the peak select block 664 applies (or performs) peak selection to the output (e.g., first deconvoluted signal) of the Wiener filter block 662. The peak selection block 664 selects peaks as disclosed above in operations 506, 508, 510, and 512 as noted in connection with FIG. 14. The peak selection block 664 matches the input time series against the four peaks at t+0, t+4, t+64, t+68, where 't' is unknown. Further, the peak select block 664 is configured to be tolerant to noise. The peak select block 664 assumes that one of the above expected peaks is missing (e.g., that peak is not among the four strongest peaks in the input). The peak select block 664 assumes up to one of the four strongest peaks is not genuine (e.g., at an arbitrary position other than the expected positions). In this case, the peak select block 664 provides an estimation of 't'. The receiver 128, 130 may then perform locationing estimation that is far less constrained by multipath and additive noise conditions for both ToF and interferometry applications as set forth herein.

In operation 700, the parametric block 668 performs a least mean square (LMS) optimization on the extracted predetermined symbol to estimate the multipath condition and to eliminate the multipath condition from the first received signal to obtain the narrowband wireless signal. In this operation 688, the parametric block 668 determines the multipath condition that is present (or that the wireless signal as transmitted from the transmitter 122, 124 undergoes while in transmission) and removes the attenuated and delayed copy so that the narrowband signal as transmitted from the transmitter 122, 124 is recovered. In other words, the receiver 128, 130 determines the multipath condition and subtracts the same from the received signal to reconstruct the narrowband signal that is originally transmitted by the transmitter 122, 124. The receiver 128, 130 may then perform the locationing estimation of the transmitter 122, 124 with the narrowband signal under mitigated multipath condition.

As noted above, the LMS algorithm, when executed by the parametric block 668, may search for, for example, five physical scalar values as given above (see Eq. 16) a two-ray model that may best fit the measured autocorrelation waveform. For example, the parametric block 668 may perform curve fitting to fit a series of data points or autocorrelation peaks as exhibited in FIG. 13. The parametric block 668 provides a parametric description of a dual path channel as characterized by Eq. 17. The receiver 128, 130 may then perform locationing estimation that is not constrained by multipath conditions and additive noise for both ToF and interferometry applications as set forth herein.

It is recognized that the method 690 employs both the non-parametric approach and the parametric approach as disclosed above for purposes of realizing the benefits and/or advantages of both approaches. In particular, both operations 696 and 700 may be performed prior to the execution of locationing estimation to predict and remove or mitigate multipath conditions in the received signals to obtain the true narrowband signal as transmitted from the transmitter 122, 124.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for providing locationing multipath mitigation for wireless communication, the system comprising:
 a receiver including at least one controller and being programmed to:
  receive a first narrowband wireless signal including a predetermined symbol from a transmitter across a wideband transmission channel that exhibits a multipath condition, the first narrowband wireless signal being convoluted with the wideband transmission channel and additive noise to form a first received signal;
  perform autocorrelation on the first received signal to extract the predetermined symbol; and
  filter the extracted predetermined symbol to deconvolve the first received signal to minimize the effects of the multipath condition and the additive noise to provide a first deconvoluted signal,
  wherein the receiver includes a matched filter to perform the autocorrelation on the first received signal to extract the predetermined symbol prior to filtering the extracted predetermined symbol to deconvolve the first received signal to provide the first deconvoluted signal, and
  wherein the receiver includes a peak select block configured to apply a peak select to the first deconvoluted signal to determine the wideband transmission channel after filtering the extracted predetermined symbol to deconvolve the first received signal to provide the first deconvoluted signal.

2. The system of claim 1, wherein the at least one controller is further programmed to apply the peak select to the first deconvoluted signal to determine an epoch of the predetermined symbol.

3. The system of claim 2, wherein the at least one controller is further programmed to perform a least mean square (LMS) optimization on the extracted predetermined symbol to estimate the multipath condition and to eliminate the multipath condition from the first received signal to obtain the first narrowband wireless signal.

4. The system of claim 3, wherein the LMS optimization is based at least on a sum of signals propagating through different paths and an epoch of a line of sight (LOS) signal as derived by peak selection.

5. The system of claim 3, wherein the at least one controller is further programmed to perform the LMS optimization on the extracted predetermined symbol after applying the peak select to the first deconvoluted signal to determine the wideband transmission channel.

6. The system of claim 2, wherein the at least one controller is further programmed to perform time of arrival (TOA) of the first narrowband signal to determine the location of the transmitter after minimizing the effects of the multipath condition and the additive noise to provide a first deconvoluted signal.

7. The system of claim 2, wherein the at least one controller is further configured to perform interferometry of the first narrowband signal to determine the location of the transmitter after minimizing the effects of the multipath condition and the additive noise to provide a first deconvoluted signal.

8. The system of claim 1, wherein the receiver includes a Wiener filter to filter the extracted predetermined symbol to deconvolve the first received signal.

9. The system of claim 1, wherein the multipath condition corresponds to at least one reflection of the first narrowband wireless signal.

10. The system of claim 1, wherein the receiver is one of a mobile device including one or more first antennas, a location tag including one or more second antennas, and an access point including one or more third antennas.

11. The system of claim 1, wherein the predetermined symbol is Long Training Field (LTF) symbol.

12. A system for providing locationing multipath mitigation for wireless communication, the system comprising:
   a receiver including at least one controller and being programmed to:
   receive a first narrowband wireless signal including a predetermined symbol from a transmitter across a wideband transmission channel that exhibits a multipath condition, the first narrowband wireless signal being convoluted with the wideband channel to form a first received signal;
   perform autocorrelation on the first received signal to extract the predetermined symbol;
   perform a least mean square (LMS) optimization on the extracted predetermined symbol to estimate the multipath condition and to eliminate the multipath condition from the first received signal to obtain the first narrowband wireless signal; and
   apply peak select to the extracted predetermined symbol prior to performing the LMS optimization on the extracted predetermined symbol.

13. The system of claim 12, wherein the at least one controller is further programmed to filter the extracted predetermined symbol to deconvolve the first received signal to minimize the effects of the multipath condition and the additive noise to provide a first deconvoluted signal.

14. The system of claim 13, wherein the at least one controller is further programmed to filter the extracted predetermined symbol prior to applying the peak select to the extracted predetermined symbol.

15. The system of claim 12, wherein the at least one controller is further programmed to perform time of arrival (TOA) of the first narrowband signal to determine a location of the transmitter after eliminating the multipath condition from the first received signal.

16. The system of claim 12, wherein the at least one controller is further configured to perform interferometry of the first narrowband signal to determine the location of the transmitter after eliminating the multipath condition from the first received signal.

17. The system of claim 12, wherein the receiver includes a matched filter to perform the autocorrelation on the first received signal to extract the predetermined symbol prior to performing the LMS optimization on the extracted predetermined symbol.

18. The system of claim 12, wherein the multipath condition corresponds to at least one reflection of the first narrowband wireless signal.

19. The system of claim 12, wherein the receiver is one of a mobile device including one or more first antennas, a location tag including one or more second antennas, and an access point including one or more third antennas.

20. The system of claim 12, wherein the predetermined symbol is Long Training Field (LTF) symbol.

21. The system of claim 12, wherein the LMS optimization is based at least on a sum of signals propagating through different paths and an epoch of a line of sight (LOS) signal as derived by peak selection.

22. A method for providing locationing multipath mitigation for wireless communication, the method comprising:
   receiving a first narrowband wireless signal including a predetermined symbol from a transmitter across a wideband transmission channel that exhibits a multipath and additive noise condition, the first narrowband wireless signal being convoluted with the wideband channel to form a first received signal;
   performing autocorrelation on the first received signal to extract the predetermined symbol;
   filtering the extracted predetermined symbol to deconvolve the first received signal to minimize the effects of the multipath condition and the additive noise to provide a first deconvoluted signal;
   performing, via a matched filter, the autocorrelation on the first received signal to extract the predetermined symbol prior to filtering the extracted predetermined symbol to deconvolve the first received signal to provide the first deconvoluted signal, and
   applying a peak select to the first deconvoluted signal to determine the wideband transmission channel after filtering the extracted predetermined symbol to deconvolve the first received signal to provide the first deconvoluted signal.

23. The method of claim 22 further comprising applying the peak select to the first deconvoluted signal to determine the wideband transmission channel.

24. The method of claim 23 further comprising performing a least mean square (LMS) optimization on the extracted predetermined symbol to estimate the multipath condition and to eliminate the multipath condition from the first received signal to obtain the first narrowband wireless signal.

25. The method of claim 24 further comprising performing the LMS optimization on the extracted predetermined symbol after applying the peak select to the first deconvoluted signal.

26. The method of claim 24, wherein the LMS optimization is based at least on a sum of signals propagating through different paths and an epoch of a line of sight (LOS) signal as derived by peak selection.

27. A method for providing locationing multipath mitigation for wireless communication, the method comprising:
   receiving a first narrowband wireless signal including a predetermined symbol from a transmitter across a wideband transmission channel that exhibits a multipath condition, the first narrowband wireless signal being convoluted with the wideband channel to form a first received signal;
   performing autocorrelation on the first received signal to extract the predetermined symbol;
   performing a least mean square (LMS) optimization on the extracted predetermined symbol to estimate the multipath condition and to eliminate the multipath condition from the first received signal to obtain the first narrowband wireless signal; and
   applying peak select to the extracted predetermined symbol prior to performing the LMS optimization on the extracted predetermined symbol.

28. The method of claim 27 further comprising filtering the extracted predetermined symbol to deconvolve the first received signal to minimize the effects of the multipath condition and the additive noise to provide a first deconvoluted signal.

29. The method of claim 28 wherein filtering the extracted predetermined symbol further includes filtering the extracted predetermined symbol prior to applying the peak select to the extracted predetermined symbol.

30. The method of claim 27, wherein the LMS optimization is based at least on a sum of signals propagating through different paths and an epoch of a line of sight (LOS) signal as derived by peak selection.

* * * * *